United States Patent
Gaal et al.

(10) Patent No.: US 10,931,433 B2
(45) Date of Patent: Feb. 23, 2021

(54) TIME DIVISION DUPLEXING TECHNIQUES FOR DUAL CONNECTIVITY TO DIFFERENT RADIO ACCESS NETWORKS

(71) Applicant: QUALCOMM Incorporated, San Diego, CA (US)

(72) Inventors: Peter Gaal, San Diego, CA (US); Heechoon Lee, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/417,445

(22) Filed: May 20, 2019

(65) Prior Publication Data

US 2019/0363866 A1 Nov. 28, 2019

Related U.S. Application Data

(60) Provisional application No. 62/675,142, filed on May 22, 2018.

(51) Int. Cl.
*H04L 5/14* (2006.01)
*H04W 72/04* (2009.01)
(Continued)

(52) U.S. Cl.
CPC .......... *H04L 5/1469* (2013.01); *H04L 1/1819* (2013.01); *H04L 5/0055* (2013.01);
(Continued)

(58) Field of Classification Search
CPC ...... H04L 5/0055; H04L 1/1812; H04L 5/001
See application file for complete search history.

(56) References Cited

U.S. PATENT DOCUMENTS 10,187,832 B2 * 1/2019 Loehr ............... H04W 72/0446
2020/0068504 A1 * 2/2020 Yi ........................ H04W 52/38

OTHER PUBLICATIONS

Huawei et al., "TP on Power Control for LTE-NR NSA Operation", 3GPP Draft; R1-1801273, 3rd Generation Partnership Project (3GPP), Mobile Competence Centre ; 650, Route Des Lucioles ; F-06921 Sophia-Antipolis Cedex; France, vol. RAN WG1, No. Vancouver, Canada; Jan. 22, 2018-Jan. 26, 2018, Jan. 29, 2018 (Jan. 29, 2018), XP051385492, 4 pages, Retrieved from the Internet: URL:http://www.3gpp.org/ftp/tsg%5Fran/WG1%5FRL1/TSGR1%5FAH/NRH%5FAH%5F1801/Docs/ [retrieved on Jan. 29, 2018], section 7.6;p. 3-p. 4.

(Continued)

*Primary Examiner* — Chandrahas B Patel
(74) *Attorney, Agent, or Firm* — Holland & Hart LLP

(57) ABSTRACT

Methods, systems, and devices for wireless communications are described that support time division duplexing (TDD) for dual connectivity (DC) to different radio access networks (RANs). A DC connection may be established between a user equipment (UE) and both a first RAN and a second RAN. A reference TDD configuration for the first RAN and a designated TDD configuration for both the first and second RAN may be identified. The designated TDD configuration may have a first set of uplink subframes and the reference TDD configuration may have a second set of uplink subframes that is a subset of the first set of uplink subframes. Downlink transmissions of the first RAN may be transmitted according to the reference TDD configuration, and uplink transmissions of the first and second RAN may be transmitted according to the designated TDD configuration.

48 Claims, 18 Drawing Sheets

(51) Int. Cl.
H04L 5/00 (2006.01)
H04W 88/06 (2009.01)
H04W 76/15 (2018.01)
H04W 8/24 (2009.01)
H04L 1/18 (2006.01)

(52) U.S. Cl.
CPC ......... *H04W 8/24* (2013.01); *H04W 72/0446* (2013.01); *H04W 76/15* (2018.02); *H04W 88/06* (2013.01)

(56) References Cited

OTHER PUBLICATIONS

International Search Report and Written Opinion—PCT/US2019/033353—ISA/EPO—dated Jul. 19, 2019.
Nokia et al., "On Single Tx Transmission Timing in TDD LTE-NR DC", 3GPP Draft; R1-1807281 on Single TX Transmission Timing in TDD LTE-NR DC V1, 3rd Generation Partnership Project (3GPP), Mobile Competence Centre, 650, Route Des Lucioles, F-06921 Sophia-Antipolis Ce, vol. RAN WG1, No. Busan, Korea; May 21, 2018-May 25, 2018, May 20, 2018 (May 20, 2018), XP051442477, 2 Pages, Retrieved from the Internet: URL:http://www.3gpp.org/ftp/Meetings%5F3GPP%5FSYNC/RAN1/Docs/ [retrieved on May 20, 2018], section 2, p. 1-p. 2; figure 1.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 4

TIME DIVISION DUPLEXING TECHNIQUES FOR DUAL CONNECTIVITY TO DIFFERENT RADIO ACCESS NETWORKS

CROSS REFERENCES

The present Application for Patent claims the benefit of U.S. Provisional Application No. 62/675,142 by Gaal et al., entitled "Time Division Duplexing Techniques For Dual Connectivity To Different Radio Access Networks," filed May 22, 2018, assigned to the assignee hereof, and expressly incorporated by reference herein in its entirety.

BACKGROUND

The following relates generally to wireless communications, and more specifically to time division duplexing techniques for dual connectivity to different radio access networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

UEs may perform a radio resource control (RRC) procedure, such as an RRC connection establishment procedure with a network node (e.g., a base station of an LTE system or NR system). The RRC connection establishment procedure involves the UE accessing a cell and transmitting an RRC connection request to the network node. Some examples of wireless communications systems provide carrier aggregation and/or dual-connectivity (DC) configuration for the UE. For example, the UE may receive data transmitted by two network nodes, when the UE is configured with DC. One network node may be a base station of a first radio access network (RAN) (e.g., an LTE base station) that may be associated with a master cell group (MCG), and another network node may be a base station of a second RAN (e.g., an NR base station) that may be associated with a secondary cell group (SCG). DC configurations across different RANs may result in some configurations and uplink/downlink transmissions that may not be compatible (e.g., concurrent transmissions of the two RANs may cause interference with each other). Efficient techniques for DC communications across multiple RANs may be desirable to help enhance network efficiency and reliability.

SUMMARY

The described techniques relate to improved methods, systems, devices, and apparatuses that support time division duplexing (TDD) techniques for dual connectivity (DC) to different radio access networks (RANs). Generally, the described techniques provide for establishing a DC connection between a user equipment (UE) and both a first RAN and a second RAN. Transmissions of the different RANs may use time division multiplexing (TDM) in some cases to provide uplink transmissions from single transmitter UEs for the different RANs. In some cases, TDM may be achieved through selection of TDD configurations and scheduling of transmissions of the different RANs in different uplink and downlink subframes. In some cases, a reference TDD configuration for the first RAN may be identified, and a designated TDD configuration for both the first and second RAN may be identified. The designated TDD configuration may have a first set of uplink subframes and the reference TDD configuration may have a second set of uplink subframes that is a subset of the first set of uplink subframes. Downlink transmissions of the first RAN may be transmitted according to the reference TDD configuration, and uplink transmissions of the first and second RAN may be transmitted according to the designated TDD configuration.

In some cases, acknowledgment/negative-acknowledgment (ACK/NACK) feedback corresponding to downlink hybrid acknowledgment repeat request (HARQ) processes of the first RAN is transmitted according to the reference TDD configuration. In some cases, ACK/NACK feedback corresponding to uplink HARQ processes of the first RAN is transmitted according to the designated TDD configuration. In some cases, the first RAN may be a fourth generation (4G) or long term evolution (LTE) RAN and the second RAN may be a fifth generation (5G) or new radio (NR) RAN, and the DC connectivity may be referred to as evolved-universal terrestrial radio access new radio dual connectivity (EN-DC), or E-UTRAN-NR DC. In such cases, the LTE RAN may provide a master carrier group (MCG) and the NR RAN may provide a secondary carrier group (SCG) in a DC configuration.

A method of wireless communication at a UE is described. The method may include establishing, at the UE, a first connection using a RAN and a second connection using a second RAN, identifying a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, receiving downlink transmissions via the first RAN according to the reference TDD configuration, and transmitting uplink transmissions via the first RAN and the second RAN according to the designated TDD configuration.

An apparatus for wireless communication at a UE is described. The apparatus may include a processor, memory in electronic communication with the processor, and instructions stored in the memory. The instructions may be executable by the processor to cause the apparatus to establish, at the UE, a first connection using a first RAN and a second connection using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, receive downlink transmissions via the first RAN according to the reference TDD configuration, and transmit uplink transmissions via the first RAN and the second RAN according to the designated TDD configuration.

Another apparatus for wireless communication at a UE is described. The apparatus may include means for establishing, at the UE, a first connection using a first RAN and a second connection using a second RAN, identifying a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, receiving downlink transmissions via the first RAN according to the reference TDD configuration, and transmitting uplink transmissions via the first RAN and the second RAN according to the designated TDD configuration.

A non-transitory computer-readable medium storing code for wireless communication at a UE is described. The code may include instructions executable by a processor to establish, at the UE, a first connection using a first RAN and a second connection using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, receive downlink transmissions via the first RAN according to the reference TDD configuration, and transmit uplink transmissions via the first RAN and the second RAN according to the designated TDD configuration.

In some examples of the method, apparatuses, and non-transitory computer-readable medium described herein ACK/NACK feedback corresponding to downlink HARQ processes of the first RAN may be transmitted according to the reference TDD configuration. In some examples of the method, apparatuses, and non-transitory computer-readable medium described herein ACK/NACK feedback corresponding to uplink HARQ processes of the first RAN may be transmitted according to the designated TDD configuration. In some examples of the method, apparatuses, and non-transitory computer-readable medium described herein may further include operations, features, means, or instructions for uplinking shared channel transmissions of the first RAN may be transmitted according to the designated TDD configuration. In some examples of the method, apparatuses, and non-transitory computer-readable medium described herein uplink ACK/NACK feedback information, uplink shared channel data, uplink control channel data, uplink reference signals, and downlink ACK/NACK feedback of the second RAN may be transmitted according to the designated TDD configuration.

Some examples of the method, apparatuses, and non-transitory computer-readable medium described herein may further include operations, features, means, or instructions for receiving scheduling information for transmitting uplink transmissions of the first RAN and the second RAN, where uplink transmissions of the first RAN may be scheduled in different uplink subframes of the designated TDD configuration than uplink transmissions of the second RAN and transmitting uplink transmissions of the first RAN and the second RAN according to the scheduling information. Some examples of the method, apparatuses, and non-transitory computer-readable medium described herein may further include operations, features, means, or instructions for determining that a first uplink transmission of the first RAN and a second uplink transmission of the second RAN may be both scheduled in a same first TDD uplink subframe and identifying the first TDD uplink subframe as an error case. Some examples of the method, apparatuses, and non-transitory computer-readable medium described herein may further include operations, features, means, or instructions for determining that a first uplink transmission of the first RAN and a second uplink transmission of the second RAN may be both scheduled in a same first TDD uplink subframe, dropping the second uplink transmission of the second RAN and transmitting the first uplink transmission of the first RAN in the first TDD uplink subframe.

In some examples of the method, apparatuses, and non-transitory computer-readable medium described herein, the first RAN may be a 4G or LTE RAN, and the second RAN may be a 5G or NR RAN. In some examples of the method, apparatuses, and non-transitory computer-readable medium described herein, the first connection using the first RAN may be established as an MCG connection and the second connection using the second RAN may be established as an SCG connection in a DC configuration.

Some examples of the method, apparatuses, and non-transitory computer-readable medium described herein may further include operations, features, means, or instructions for determining, prior to identifying the reference TDD configuration, a dynamic sharing capability of the UE and single or dual transmission capability of the UE, and where the reference TDD configuration may be identified based on the dynamic sharing capability and the single or dual transmission capability.

A method of wireless communication at a base station is described. The method may include establishing a first connection with a UE using a first RAN, and where a second connection is established at the UE using a second RAN, identifying a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, transmitting downlink transmissions to the UE via the first RAN according to the reference TDD configuration, and receiving uplink transmissions from the UE via the first RAN according to the designated TDD configuration, and where the UE transmits uplink transmissions via the second RAN according to the designated TDD configuration.

An apparatus for wireless communication at a base station is described. The apparatus may include a processor, memory in electronic communication with the processor, and instructions stored in the memory. The instructions may be executable by the processor to cause the apparatus to establish a first connection with a UE using a first RAN, and where a second connection is established at the UE using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, transmit downlink transmissions to the UE via the first RAN according to the reference TDD configuration, and receive uplink transmissions from the UE via the first RAN according to the designated TDD configuration, and where the UE transmits uplink transmissions via the second RAN according to the designated TDD configuration.

Another apparatus for wireless communication at a base station is described. The apparatus may include means for establishing a first connection with a UE using a first RAN, and where a second connection is established at the UE using a second RAN, identifying a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, transmitting downlink transmissions to the UE via the first RAN according to the reference TDD configuration, and receiving uplink transmissions from the UE via the first RAN according to the designated TDD configuration, and where the UE transmits uplink transmissions via the second RAN according to the designated TDD configuration.

A non-transitory computer-readable medium storing code for wireless communication at a base station is described. The code may include instructions executable by a processor to establish a first connection with a UE using a first RAN, and where a second connection is established at the UE using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, transmit downlink transmissions to the UE via the first RAN according to the reference TDD configuration, and receive uplink transmissions from the UE via the first RAN according to the designated TDD configuration, and where the UE transmits uplink transmissions via the second RAN according to the designated TDD configuration.

In some examples of the method, apparatuses, and non-transitory computer-readable medium described herein ACK/NACK feedback corresponding to downlink HARQ processes of the first RAN may be transmitted according to the reference TDD configuration. In some examples of the method, apparatuses, and non-transitory computer-readable medium described herein ACK/NACK feedback corresponding to uplink HARQ processes of the first RAN may be transmitted according to the designated TDD configuration. In some examples of the method, apparatuses, and non-transitory computer-readable medium described herein uplink shared channel transmissions of the first RAN may be transmitted according to the designated TDD configuration. In some examples of the method, apparatuses, and non-transitory computer-readable medium described herein uplink ACK/NACK feedback information, uplink shared channel data, uplink control channel data, uplink reference signals, and downlink ACK/NACK feedback of the second RAN may be transmitted according to the designated TDD configuration.

Some examples of the method, apparatuses, and non-transitory computer-readable medium described herein may further include operations, features, means, or instructions for scheduling the UE for uplink transmissions via the first RAN and the second RAN, where uplink transmissions of the first RAN may be scheduled in different uplink subframes of the designated TDD configuration than uplink transmissions of the second RAN and receiving uplink transmissions from the UE according to the scheduling. In some examples of the method, apparatuses, and non-transitory computer-readable medium described herein, the UE may be configured to identify an error case when a first uplink transmission of the first RAN and a second uplink transmission of the second RAN may be both scheduled in a same first TDD uplink subframe. Some examples of the method, apparatuses, and non-transitory computer-readable medium described herein may further include operations, features, means, or instructions for receiving a first uplink transmission of the first RAN in a first TDD uplink subframe when the first uplink transmission of the first RAN and a second uplink transmission of the second RAN may be both scheduled in the first TDD uplink subframe, and where the UE drops the second uplink transmission of the second RAN.

In some examples of the method, apparatuses, and non-transitory computer-readable medium described herein, the first RAN may be a 4G or LTE RAN, and the second RAN may be a 5G or NR RAN. In some examples of the method, apparatuses, and non-transitory computer-readable medium described herein, the first connection using the first RAN may be established as an MCG connection and the second connection using the second RAN may be established as a SCG connection in a DC configuration.

Some examples of the method, apparatuses, and non-transitory computer-readable medium described herein may further include operations, features, means, or instructions for receiving, from the UE prior to identifying the reference TDD configuration, a dynamic sharing capability of the UE and single or dual transmission capability of the UE, and where the reference TDD configuration may be identified based on the dynamic sharing capability and the single or dual transmission capability.

BRIEF DESCRIPTION OF THE DRAWINGS

FIG. 4 illustrates an example of TDD formats that support time division duplexing techniques for dual connectivity to different radio access networks in accordance with aspects of the present disclosure.

DETAILED DESCRIPTION

Various aspects of the present disclosure provide time division duplexing (TDD) techniques for dual connectivity (DC) to different radio access networks (RANs). In some cases, a DC connection may be established between a user equipment (UE) and a first RAN and a second RAN. Such a DC connection may be, for example, a DC connection in which a master carrier group (MCG) is a long term evolution (LTE) RAN and a secondary carrier group (SCG) is a new radio (NR) RAN, and such a DC configuration may be referred to as EN-DC.

In some cases, a UE in such a DC configuration may have a single transmitter for transmitting both LTE and NR communications. In such cases, transmissions of the different RANs may use time division multiplexing (TDM), which may be achieved through selection of TDD configurations and scheduling of transmissions of the different RANs in different uplink and downlink subframes. In some cases, a reference TDD configuration for the first RAN (e.g., LTE RAN) may be identified, and a designated TDD configuration for both the first RAN and second RAN (e.g., NR RAN) may be identified. The designated TDD configuration may have a first set of uplink subframes and the reference TDD configuration may have a second set of uplink subframes that is a subset of the first set of uplink subframes. Downlink transmissions of the first RAN may be transmitted according to the reference TDD configuration, and uplink transmissions of the first and second RAN may be transmitted according to the designated TDD configuration.

In some cases, ACK/NACK feedback corresponding to downlink HARQ processes of the first RAN is transmitted according to the reference TDD configuration. In some cases, ACK/NACK feedback corresponding to uplink HARQ processes of the first RAN is transmitted according to the designated TDD configuration. In some cases, the first RAN may be a fourth generation (4G) or LTE RAN and the second RAN may be a fifth generation (5G) or NR RAN, and the DC connectivity may be referred to as EN-DC, or E-UTRAN-NR DC. In such cases, the LTE RAN may provide a MCG and the NR RAN may provide an SCG in a DC configuration. Such techniques may provide for TDM of uplink transmissions of the different RANs, which may provide more efficient and reliable communications via both the first RAN and the second RAN.

Aspects of the disclosure are initially described in the context of a wireless communications system. Aspects of the disclosure are further illustrated by and described with reference to apparatus diagrams, system diagrams, and flowcharts that relate to TDD techniques for DC to different RANs.

Figure 1:
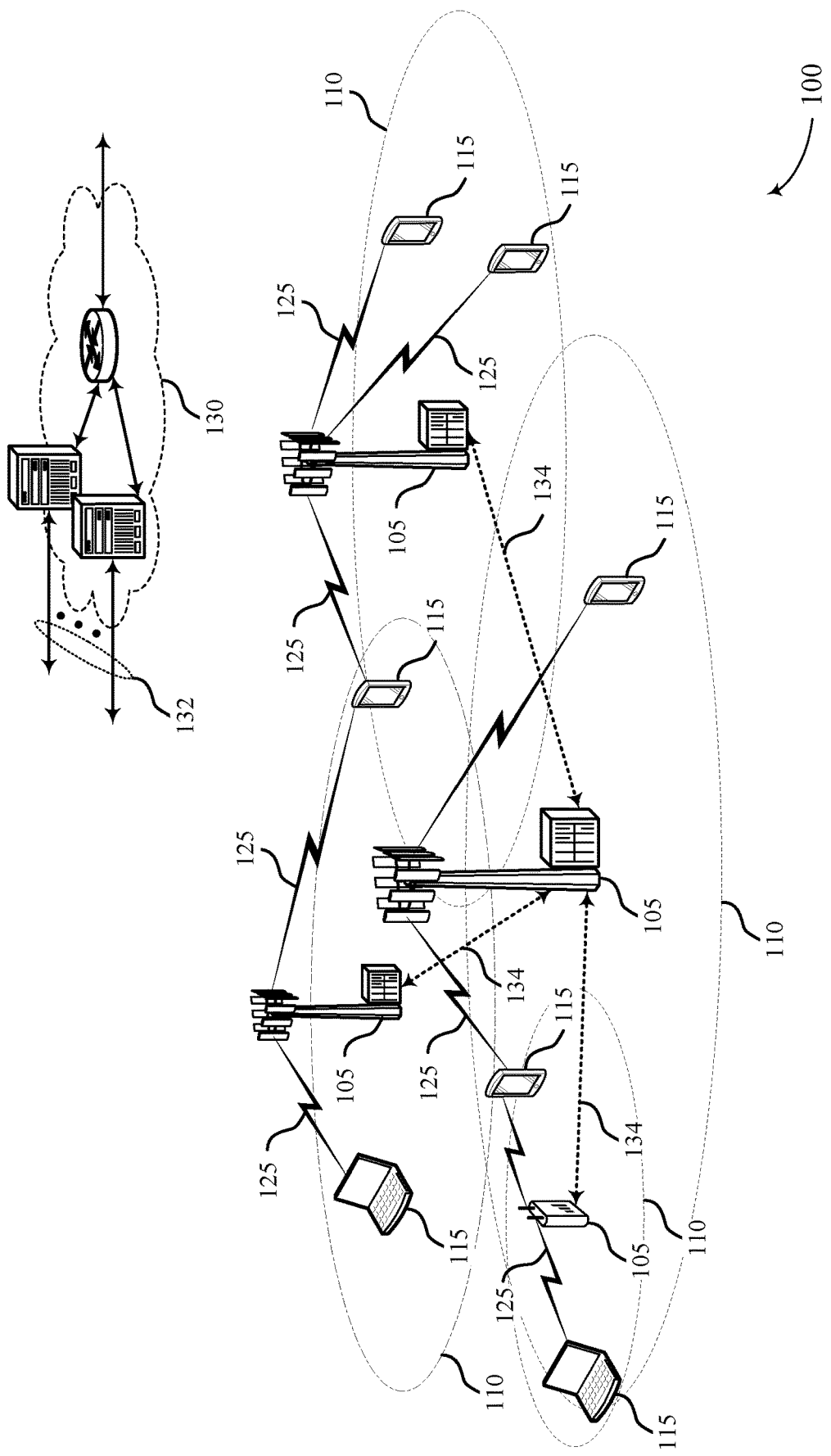
FIG. 1 illustrates an example of a system for wireless communications that supports time division duplexing techniques for dual connectivity to different radio access networks in accordance with aspects of the present disclosure.

FIG. 1 illustrates an example of a wireless communications system 100 that supports time division duplexing techniques for dual connectivity to different radio access networks in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices. In some cases, one or more base station 105 may provide connectivity to a first RAN (e.g., LTE connectivity), and one or more base stations 105 may provide connectivity to a second RAN (e.g., an NR RAN). A UE 115 may connect in a DC mode both RANs and may communicate using the different RANs in accordance with various techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, one or more base station 105 may provide connectivity to a first RAN, such as an LTE RAN, and one or more base stations 105 may provide connectivity to a second RAN, such as an NR RAN. In such cases, a DC connection may be established between a UE 115 and the first and second RAN. Such a DC connection may be, for example, a DC connection in which the first RAN (e.g., LTE) provides an MCG and the second RAN (e.g., NR) provides an SCG. Such a DC configuration with an LTE MCG and a NR SCG may be referred to as EN-DC. In some cases, due to more limited coverage areas fin some NR deployments, an LTE connection may be established for initial system access for a UE 115, and then NR configured such that NR communications may be a utilized when the UE 115 is in a service area of a NR cell.

Further, in some case, the UE may have a single transmitter for transmitting both LTE and NR communications. In such cases, transmissions of the different RANs may use TDM, which may be achieved through selection of TDD configurations and scheduling of transmissions of the different RANs in different uplink and downlink subframes. In some cases, a reference TDD configuration for the first RAN may be identified, and a designated TDD configuration for both the first RAN and second RAN may be identified. The designated TDD configuration may have a first set of uplink subframes and the reference TDD configuration may have a second set of uplink subframes that is a subset of the first set of uplink subframes. Downlink transmissions of the first RAN may be transmitted according to the reference TDD configuration, and uplink transmissions of the first and second RAN may be transmitted according to the designated TDD configuration.

Figure 2:
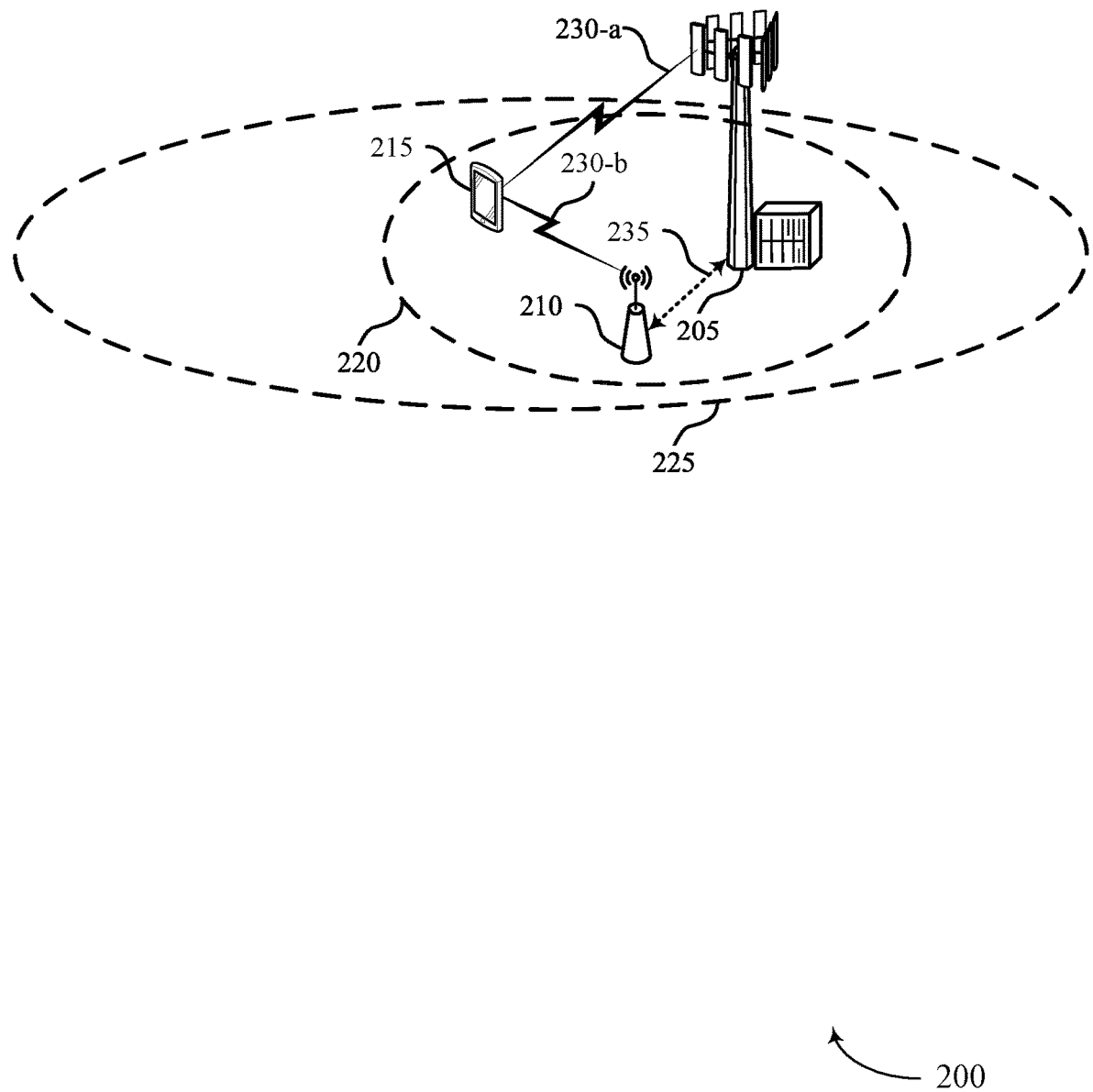
FIG. 2 illustrates an example of a portion of a wireless communications system that supports time division duplexing techniques for dual connectivity to different radio access networks in accordance with aspects of the present disclosure.

FIG. 2 illustrates an example of a wireless communications system 200 that supports time division duplexing techniques for dual connectivity to different radio access networks in accordance with aspects of the present disclosure. In some examples, wireless communications system 200 may implement aspects of wireless communications system 100. In the example of FIG. 2, wireless communications system 200 may include UE 215, a first base station 205, and a second base station 210. UE 215 may be an example of one or more UEs as described herein with reference to FIG. 1. In some cases, first base station 205 may be an eNB of an LTE RAN as described herein with reference to FIG. 1, and second base station 210 may be a gNB of a NR RAN as described herein with reference to FIG. 1. First base station 205 may be associated with a coverage area 225. Additionally, second base station 210 may be associated with a coverage area 220. Both first base station 205 and second base station 210 may communicate with UE 215 via communication links 230. Aspects of the following communication examples are described as occurring between UE 215, first base station 205, and second base station 210.

As indicated above, in some cases, UE 215 may be configured for carrier aggregation or dual-connectivity to improve data throughput. The UE 215 may be in an RRC idle mode or an RRC inactive mode. The RRC idle mode and/or the RRC inactive mode may be an operational indication that the UE 215 has no RRC connection established with a network (e.g., first base station 205 or second base station 210, or both). During the RRC idle mode or the RRC inactive mode, the UE 215 may receive system information from first base station 205. In some cases, the system information may include the relevant frequencies for the UE 215 to measure on same or different RANs. For example, the system information may indicate frequencies associated with an LTE system or an NR system. Additionally or alternatively, the UE 215 may receive the system information as part of a system information block (SIB) message from first base station 205.

Figure 3:
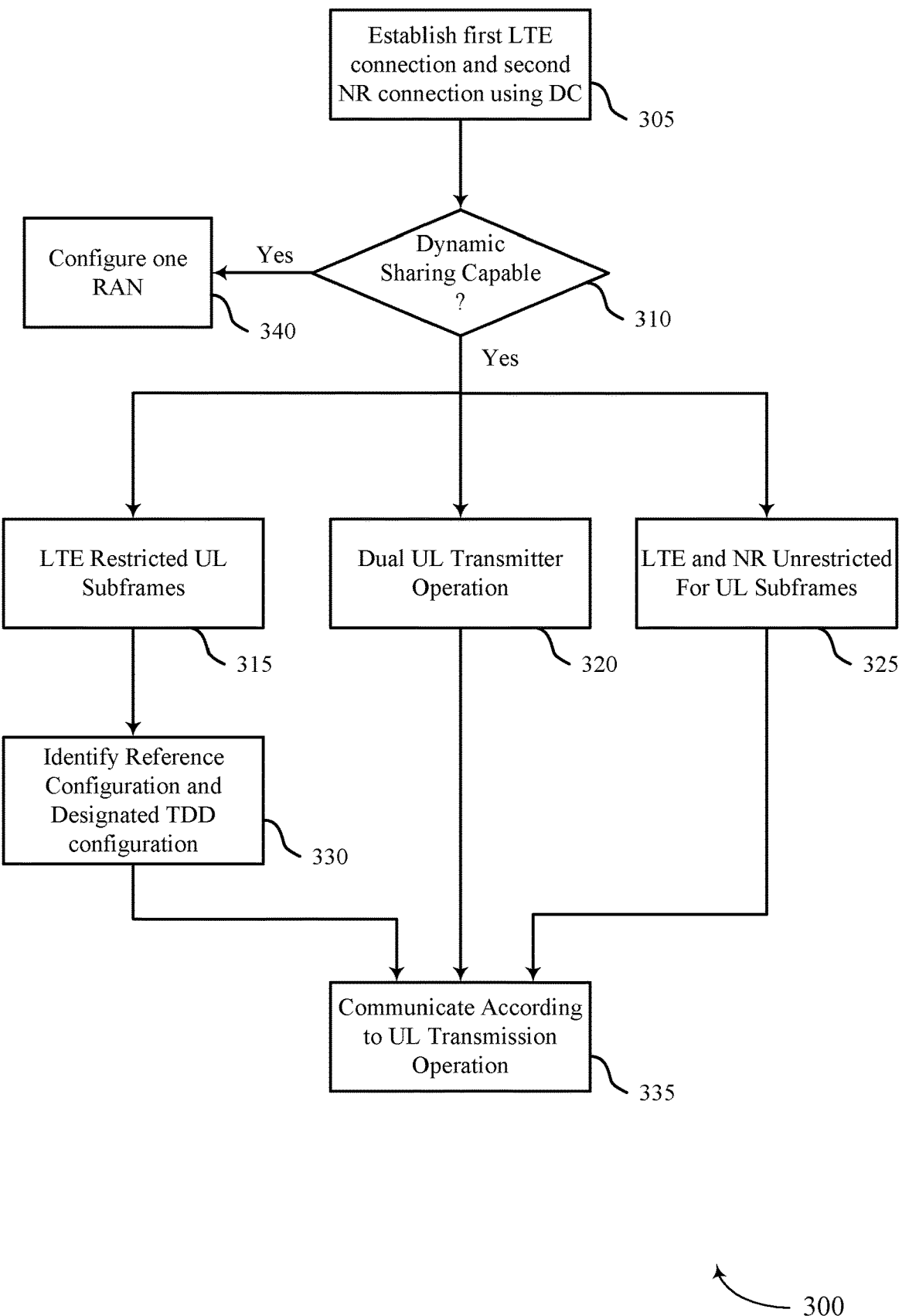
FIG. 3 illustrates an example of a Process flow that supports time division duplexing techniques for dual connectivity to different radio access networks in accordance with aspects of the present disclosure.

The UE 215 may initiate a connection establishment procedure to establish an RRC connection with both the first base station 205 and the second base station 210. In some cases, as discussed above, the first base station 205 may provide a primary connection on a MCG, and the second base station 210 may provide a connection on a SCG. When establishing the connections with the first base station 205 and the second base station 210, the UE 215 may provide an indication of UE 215 capabilities. Such capabilities may include, for example, a capability for dynamic sharing between the different RANs of the DC connection. In some cases, the UE 215 may be a single transmitter UE in which a single transmitter is shared for uplink transmissions on the communication links 230. In such cases, the transmitter may be used for transmissions to the first base station via first communications link 230-a during a first time period, and may be used for transmissions to the second base station via second communications link 230-b during a second time period. Thus, transmissions of the first RAN and second RAN may be TDM'ed at the UE. In other cases, the UE 215 may be a dual transmitter UE that is capable of concurrent transmissions on both the first RAN and the second RAN. In some cases, even though the UE 215 may have hardware for dual transmissions to the different RANs, a single transmitter operation mode may be selected (e.g., due to power constraints or thermal constraints at the UE 215). FIG. 3 illustrates a process flow related to reporting of UE 215 capability and a DC configuration based on the UE 215 capabilities.

FIG. 3 illustrates an example of a process flow 300 that supports time division duplexing techniques for dual connectivity to different radio access networks in accordance with aspects of the present disclosure. In some examples, process flow 300 may implement aspects of wireless communications system 100 or 200. In this example, an EN-DC configuration may be established with an LTE RAN and a NR RAN.

At 305, a first connection may be established for an LTE RAN, and a second connection may be established for a NR RAN. As discussed above, the LTE RAN may provide an MCG for the UE, and the NR RAN may provide a SCG for the UE. The connections may be established, for example, according to established radio resource configuration (RRC) connection establishment techniques.

At 310, it may be determined whether the UE is dynamic sharing capable. Such a determination may be based on a UE capability to transmit both LTE and NR transmissions in a dynamic manner. In some cases, the determination may be made when the connection with the NR RAN is established, and in some cases may be based on a hardware capability of the UE (e.g., processing capabilities of the UE, transmitter configuration of the UE, etc.). In some cases, the determination may be based on conditions at the UE (e.g., power or thermal constraints, etc.). In the event that the UE is not capably of dynamic sharing, one RAN may be configured, as indicated at 340.

If it is determined that the UE is capable of dynamic sharing the UE may select from a number of different options. In some cases, the UE may select a first option in which the LTE RAN has a restriction on a subset of subframes, as indicated at 315. In some cases, such an option may be referred to as Case 1B TDM. In such cases, the UE may be configured with a single transmitter and LTE and NR uplink transmissions may be TDM'ed using the single transmitter. In some cases, the LTE RAN is restricted to uplink transmissions on a configured subset of subframes, and the NR RAN may not have any restrictions on available subframes for uplink transmissions. In such cases, if there is a collision between scheduled LTE and NR uplink transmissions in a subframe, the UE may drop the NR transmission as being associated with the SCG.

In some cases, the UE may select a dual uplink operation option in which simultaneous uplink transmissions may be used for the LTE RAN and the NR RAN, as indicated at 320. In such cases, neither the LTE RAN nor the NR RAN are restricted to designated subframes, as simultaneous transmission is supported when there is a collision between LTE uplink transmissions and NR uplink transmissions. In such cases, a transmission length alignment between LTE and NR transmissions may be configured, such that the UE does not transmit LTE using one transmitter while attempting to receive NR on another transmitter.

In further cases, if it is determined at 310 that the UE is capable of dynamic sharing, the UE may select a second TDM option in which both LTE and NR have no restrictions on uplink subframes that can be used for uplink transmissions, as indicated at 325. In some cases, such an option may be referred to as Case 2 TDM. In such cases, the UE may be configured with a single transmitter and LTE and NR uplink transmissions may be TDM'ed using the single transmitter. In such cases, if there is a collision between scheduled LTE and NR uplink transmissions in a subframe, the UE may drop the NR transmission as being associated with the SCG.

In some cases, the UE may signal to the LTE base station the UE capability and the selected option for the EN-DC transmissions. In cases where the option of block 315 is selected, at 330, a reference configuration may be identified, and a designated TDD configuration may be identified. The reference configuration and TDD configuration may restrict the uplink subframes that may be used by the LTE RAN for uplink transmissions, in some examples. In some examples, as will be discussed in more detail below, the designated TDD configuration may have a first set of uplink subframes, and the reference configuration may be selected as a different TDD configuration with a second set of uplink subframes that are a subset of the first set of subframes. The LTE RAN may be restricted such that ACK/NACK transmissions corresponding to LTE downlink HARQ follow the reference configuration. In such cases, ACK/NACK transmissions corresponding to LTE uplink HARQ may follow the designated configuration, as well as all uplink transmissions of the NR RAN.

Such techniques for restricting uplink subframes for LTE transmissions may provide that both LTE and NR may use a same designated TDD configuration, and uplink transmissions for NR and LTE may be TDM'ed, while providing resources for ACK/NACK transmissions corresponding to LTE downlink HARQ that follow the reference configuration (e.g., according to the subset of uplink subframes of the designated TDD configuration). In such cases, ACK/NACK transmissions corresponding to LTE uplink HARQ may follow the designated configuration, as well as all NR uplink transmissions (e.g., uplink control channel transmissions, uplink shared channel transmissions, ACK/NACK transmissions for uplink and downlink HARQ, sounding reference signal (SRS) transmissions, etc.). Such techniques thus provide additional uplink subframes for LTE relative to limiting all uplink transmissions to the reference configuration.

At block 335, the UE and base stations may communicate according to the selected uplink transmission operation. In some cases, the UE may indicate to the scheduling base station the selected uplink transmission operation, and the UE may receive an indication of the reference configuration and designated TDD configuration. In some cases, the LTE and NR base stations may coordinate to avoid collision between LTE uplink and NR uplink transmissions. In such cases, a collision that is identified at a UE may be treated as an error case in which no UE behavior is defined. In other cases, a collision may be allowed, ant the UE may drop the colliding NR uplink transmission and transmit the LTE uplink transmission.

As indicated above, a reference configuration may have a subset of uplink subframes that are configured in a designated TDD configuration.

FIG. 4 illustrates an example of TDD formats 400 that support time division duplexing techniques for dual connectivity to different radio access networks in accordance with aspects of the present disclosure. In some examples, TDD formats 400 may implement aspects of wireless communications system 100 or 200.

For TDD frame structures, each subframe may carry UL or DL traffic, and special subframes ("S") may be used to switch between DL to UL transmission. Allocation of UL and DL subframes within radio frames may be symmetric or asymmetric and may be reconfigured semi-statically (e.g., RRC messages via backhaul, etc.). Special subframes may carry some DL and/or UL traffic and may include a Guard Period (GP) between DL and UL traffic. Switching from UL to DL traffic may be achieved by setting timing advance at the UEs without the use of Special subframes or a guard period between UL and DL subframes. UL-DL configurations with switch-point periodicity equal to the frame period (e.g., 10 ms) or half of the frame period (e.g., 5 ms) may be supported.

For LTE and NR deployments, seven different UL-DL configurations are defined that provide between 40% and 90% DL subframes as illustrated in table FIG. 4. The particular TDD UL/DL configuration that is used by a base station may be based on user requirements for the particular coverage area. In this example a designated TDD configuration 405 may include two uplink subframes (SF 2 and SF 7), and a reference configuration 410 may include one uplink subframe (SF 2), such that the uplink subframes of the reference configuration 410 is a subset of the uplink subframes of the designated TDD configuration 405. It is to be understood that the example of FIG. 4 is for illustration and discussion purposes only, and that other reference configurations and designated TDD configurations may be configured in accordance with the techniques discussed herein.

Figure 5:
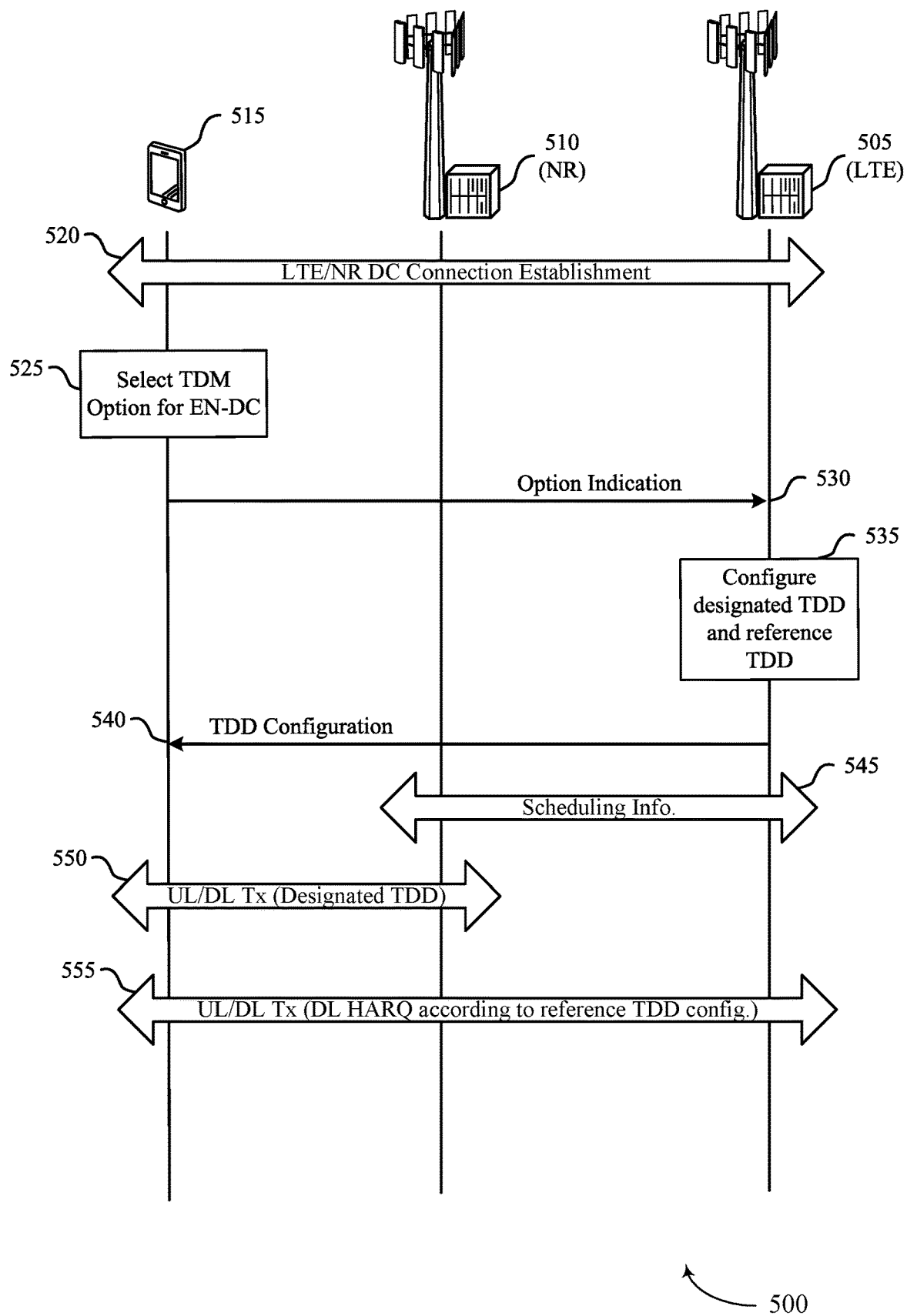
FIG. 5 illustrates an example of a process flow that supports time division duplexing techniques for dual connectivity to different radio access networks in accordance with aspects of the present disclosure.

FIG. 5 illustrates an example of a process flow 500 that supports time division duplexing techniques for dual connectivity to different radio access networks in accordance with aspects of the present disclosure. In some examples, process flow 500 may implement aspects of wireless communications system 100 or 200. Process flow 500 may include UE 515, a first base station 505, and a second base station 510. UE 515 may be examples of one or more UEs as described herein with reference to FIGS. 1 and/or 2. First base station 505 may be an eNB as described herein with reference to FIGS. 1 and/or 2. Second base station 510 may be a gNB as described herein with reference to FIGS. 1 and/or 2. For example, first base station 505 may be associated with an LTE system and second base station 510 may be associated with a NR system. Aspects of the following communication examples are described as occurring between UE 515, first base station 505, and second base station 510.

At 520, UE 515 and the first base station 505 and the second base station 510 may perform connection establishment procedures to configure a DC connection at the UE 515. Such connection establishment procedure may include RRC connection establishment procedures for MCG establishment with the first base station 505 and for SCG establishment with the second base station 510.

At 525, the UE 515 may select a TDM option for EN-DC, such as according to techniques discussed above with respect to FIG. 3. As discussed above with reference to FIG. 3, the TDM option may include, in some cases, an option in which LTE uplink subframes are restricted for a subset of uplink subframes that may be configured according to a designated TDD configuration between the UE 515 and the base stations 505 and 510. The UE 515 may transmit an indication of the selected option 530 to the first base station 505, in some examples.

At 535, the first base station 505 may configure a designated TDD configuration and a reference configuration. As discussed above, the designated TDD configuration may have a first set of uplink subframes (e.g., two UL subframes), and the reference configuration may have a second set of uplink subframes (e.g., one UL subframe having a location in a TDD frame that corresponds with one of the uplink subframes of the first set of uplink subframes. The first base station 505 may transmit a TDD configuration 540 to the UE 515, which the UE 515 may use for identifying available uplink subframes for uplink transmissions to the first base station 505 and the second base station 510.

At 545, the first base station 505 and the second base station 510 may coordinate such that collisions between uplink subframes of LTE and NR are avoided. In some cases, collisions may be allowed, and the UE 515 may be configured to drop an uplink subframe of one of the base stations (e.g., the UE may drop the NR uplink transmission) in the event of a collision. In some cases, a collision may be an error case and no UE 515 behavior is defined. The UE 515 and the second base station 510 may transmit uplink and downlink transmissions 550 in accordance with the designated TDD configuration. The UE 515 and the first base station 505 may transmit uplink and downlink transmissions 555, in which downlink HARQ may follow the reference configuration and uplink HARQ may follow the designated TDD configuration, with other transmissions following the designated TDD configuration.

Figure 6:
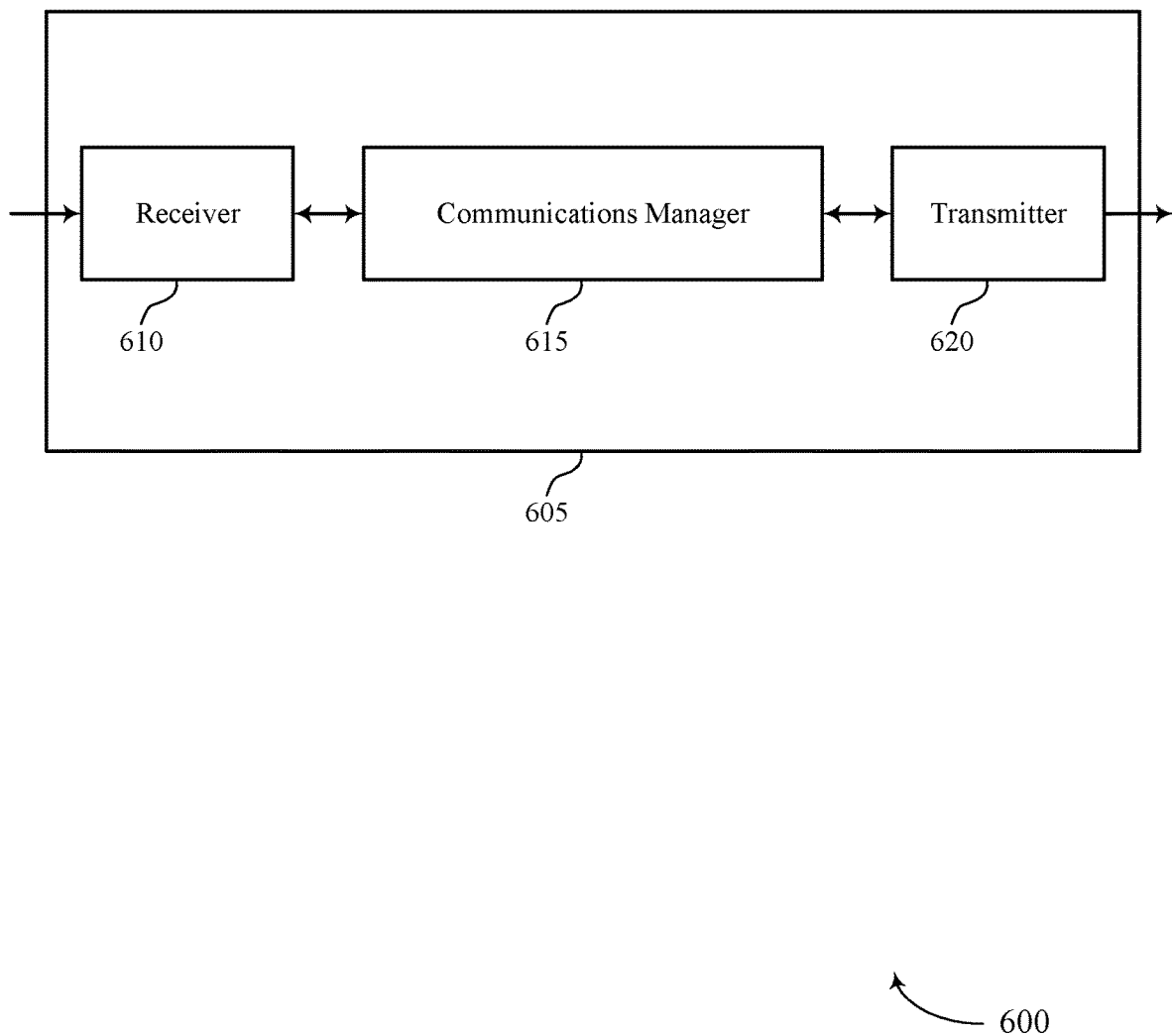
FIGS. 6 and 7 show block diagrams of devices that support time division duplexing techniques for dual connectivity to different radio access networks in accordance with aspects of the present disclosure.

FIG. 6 shows a block diagram 600 of a device 605 that supports time division duplexing techniques for dual connectivity to different radio access networks in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to TDD techniques for DC to different RANs, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish, at the UE, a first connection using a first RAN and a second connection using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, receive downlink transmissions via the first RAN according to the reference TDD configuration, and transmit uplink transmissions via the first RAN and the second RAN according to the designated TDD configuration. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615 as described herein may be implemented to realize one or more potential advantages. One implementation may allow a UE 115 to employ DC configurations across different RANs which may result in increased compatibility of uplink/downlink transmissions. Additionally or alternatively, the UE 115 may reduce interference of concurrent transmissions of multiple RANs. The described implementations may increase network efficiency by reducing interference and increasing compatibility of uplink/downlink transmissions.

Figure 7:
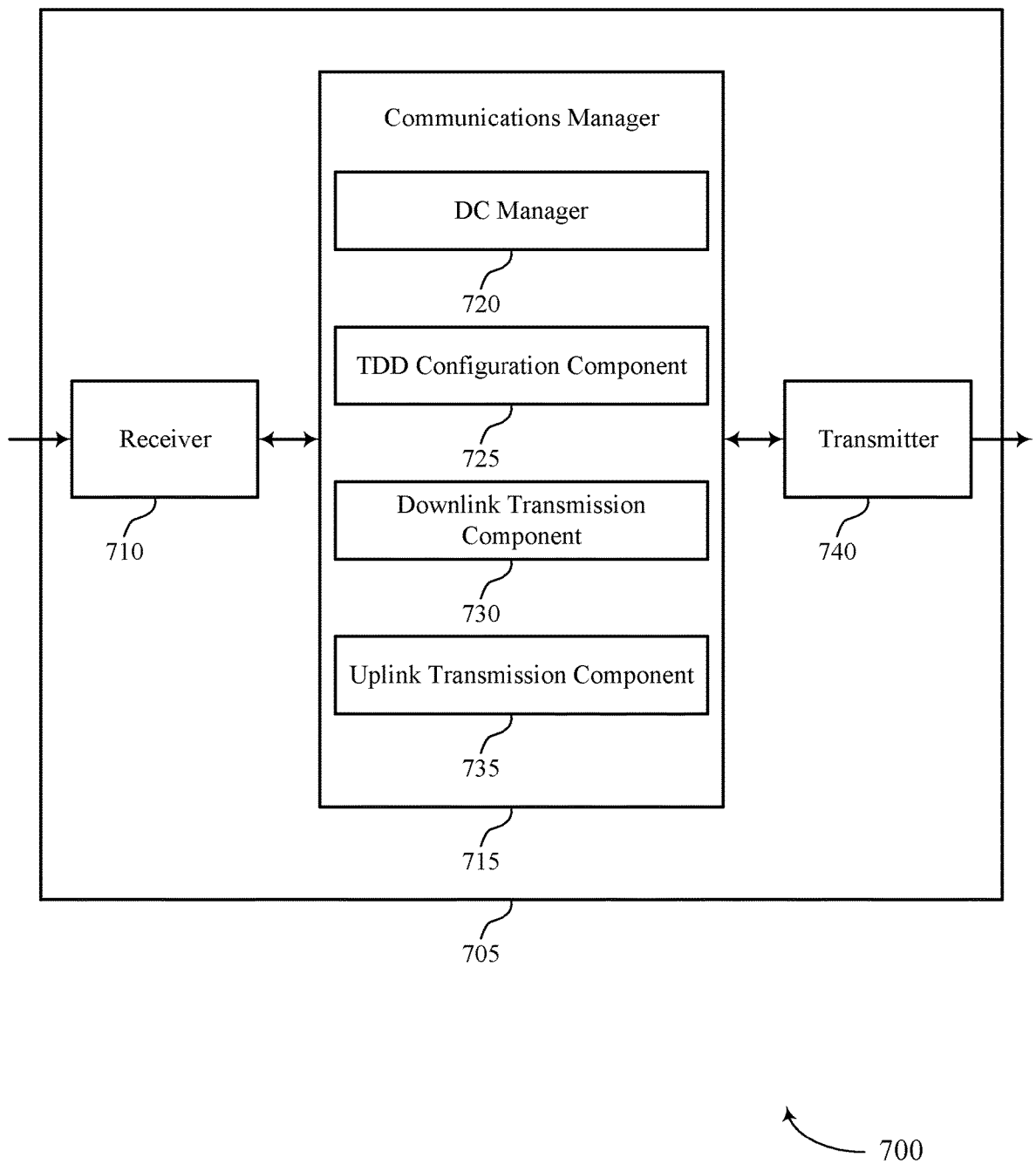

FIG. 7 shows a block diagram 700 of a device 705 that supports time division duplexing techniques for dual connectivity to different radio access networks in accordance with aspects of the present disclosure. The device 705 may be an example of aspects of a device 605 or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to TDD techniques for DC to different RANs, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a DC manager 720, a TDD configuration component 725, a downlink transmission component 730, and an uplink transmission component 735. The communications manager 715 may be an example of aspects of the communications manager 910 described herein.

The DC manager 720 may establish, at the UE, a first connection using a first RAN and a second connection using a second RAN.

The TDD configuration component 725 may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes.

The downlink transmission component 730 may receive downlink transmissions via the first RAN according to the reference TDD configuration.

The uplink transmission component 735 may transmit uplink transmissions via the first RAN and the second RAN according to the designated TDD configuration.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Based on identifying a reference TDD configuration for the first connection and a designated TDD configuration for both the first connection and the second connection, a processor of the UE 115 (e.g., controlling the receiver 710 or the transmitter 740, or the transceiver 920 as described with reference to FIG. 9) may be implemented to realize one or more potential advantages. One implementation may allow the processor of the UE 115 to implement and/or appropriately select a single or dual transmission mode which may reduce the number of dropped transmissions and decrease the otherwise resulting collisions.

Figure 8:
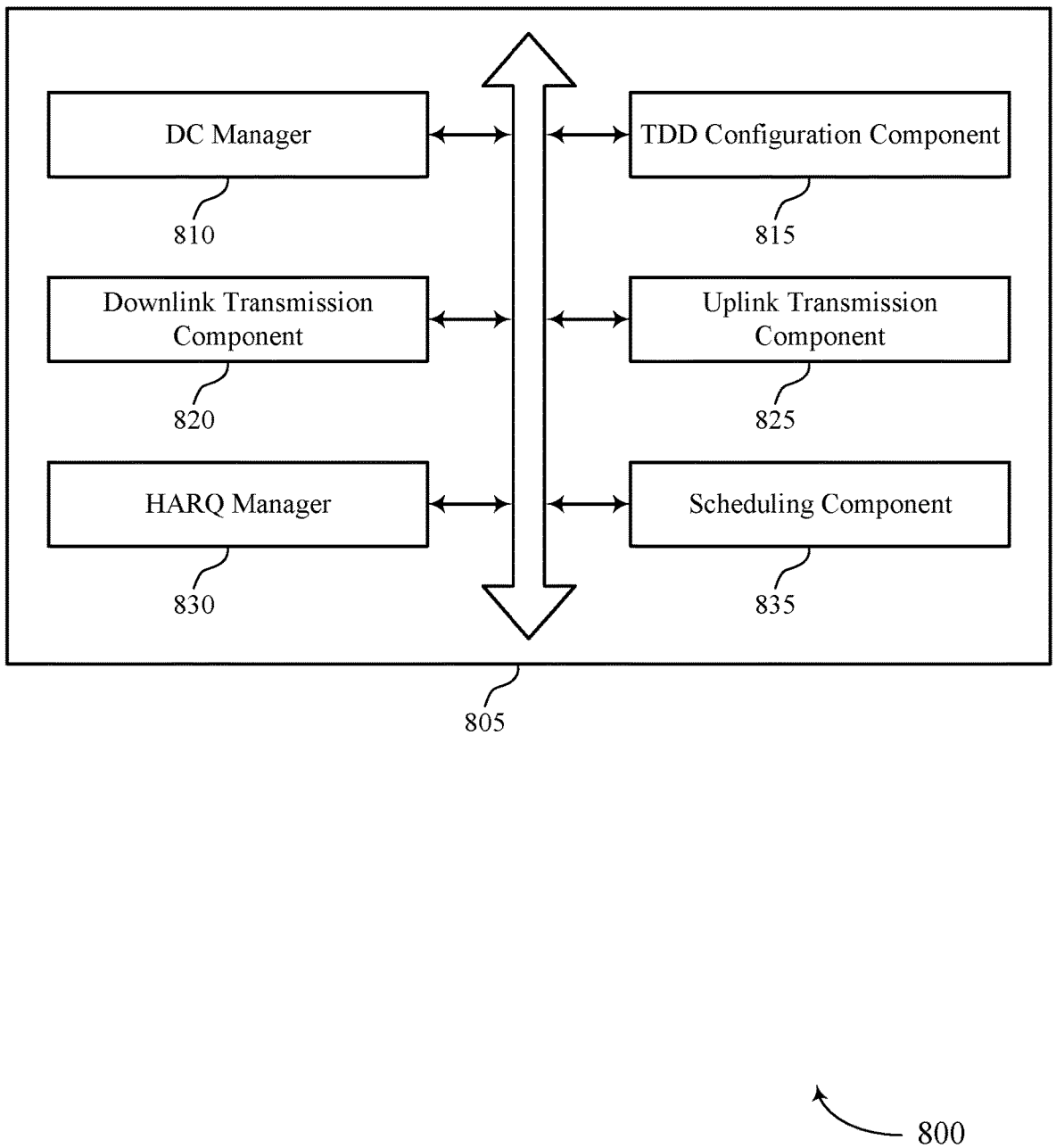
FIG. 8 shows a block diagram of a communications manager that supports time division duplexing techniques for dual connectivity to different radio access networks in accordance with aspects of the present disclosure.

FIG. 8 shows a block diagram 800 of a communications manager 805 that supports time division duplexing techniques for dual connectivity to different radio access networks in accordance with aspects of the present disclosure. The communications manager 805 may be an example of aspects of a communications manager 615, a communications manager 715, or a communications manager 910 described herein. The communications manager 805 may include a DC manager 810, a TDD configuration component 815, a downlink transmission component 820, an uplink transmission component 825, a HARQ manager 830, and a scheduling component 835. Each of these modules may communicate, directly or indirectly, with one another (e.g., via one or more buses).

The DC manager 810 may establish, at the UE, a first connection using a first RAN and a second connection using a second RAN. In some examples, the DC manager 810 may determine, prior to identifying the reference TDD configuration, a dynamic sharing capability of the UE and single or dual transmission capability of the UE, and where the reference TDD configuration is identified based on the dynamic sharing capability and the single or dual transmission capability. In some cases, the first RAN is a 4G or LTE RAN, and the second RAN is a 5G or NR RAN. In some cases, the first connection using the first RAN is established as a MCG connection and the second connection using the second RAN is established as an SCG connection in a DC configuration.

The TDD configuration component 815 may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes. In some examples, the TDD configuration component 815 may transmit uplink ACK/NACK feedback information, uplink shared channel data, uplink control channel data, uplink reference signals, and downlink ACK/NACK feedback of the second RAN according to the designated TDD configuration.

The downlink transmission component 820 may receive downlink transmissions via the first RAN according to the reference TDD configuration. The uplink transmission component 825 may transmit uplink transmissions via the first RAN and the second RAN according to the designated TDD configuration.

The HARQ manager 830 may manage ACK/NACK feedback corresponding to downlink HARQ processes of the first RAN according to the reference TDD configuration. In some examples, the HARQ manager 830 may manage ACK/NACK feedback corresponding to uplink HARQ processes of the first RAN according to the designated TDD configuration.

The scheduling component 835 may receive scheduling information for transmitting uplink transmissions of the first RAN and the second RAN, where uplink transmissions of the first RAN are scheduled in different uplink subframes of the designated TDD configuration than uplink transmissions of the second RAN. In some examples, the scheduling component 835 may transmit uplink transmissions of the first RAN and the second RAN according to the scheduling information. In some examples, the scheduling component 835 may determine that a first uplink transmission of the first RAN and a second uplink transmission of the second RAN are both scheduled in a same first TDD uplink subframe, and may identify the first TDD uplink subframe as an error case. In some examples, the scheduling component 835 may determine that a first uplink transmission of the first RAN and a second uplink transmission of the second RAN are both scheduled in a same first TDD uplink subframe, may drop the second uplink transmission of the second RAN, and may transmit the first uplink transmission of the first RAN in the first TDD uplink subframe.

Figure 9:
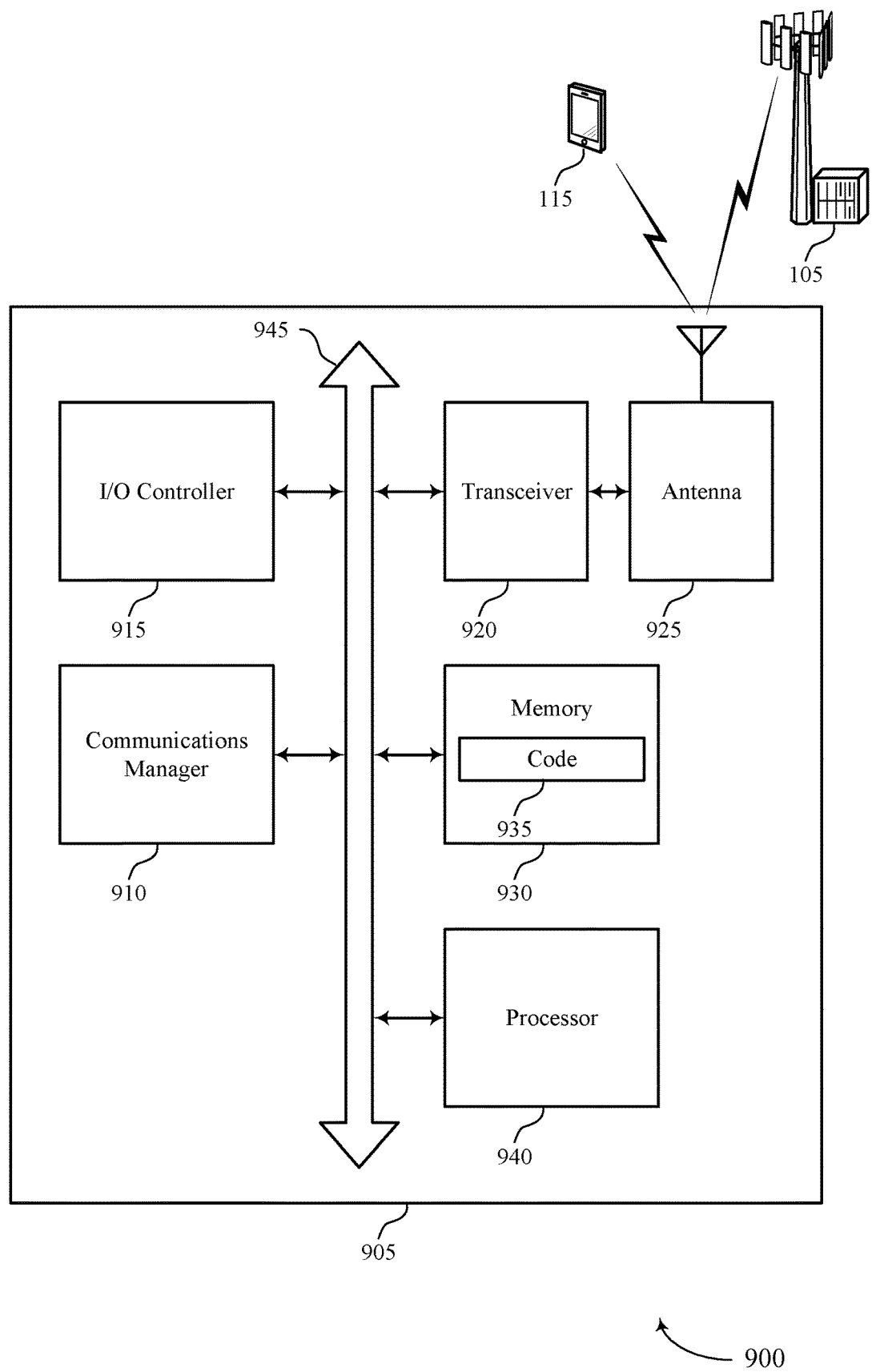
FIG. 9 shows a diagram of a system including a device that supports time division duplexing techniques for dual connectivity to different radio access networks in accordance with aspects of the present disclosure.

FIG. 9 shows a diagram of a system 900 including a device 905 that supports time division duplexing techniques for dual connectivity to different radio access networks in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish, at the UE, a first connection using a first RAN and a second connection using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, receive downlink transmissions via the first RAN according to the reference TDD configuration, and transmit uplink transmissions via the first RAN and the second RAN according to the designated TDD configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver.

The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting TDD techniques for DC to different RANs).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
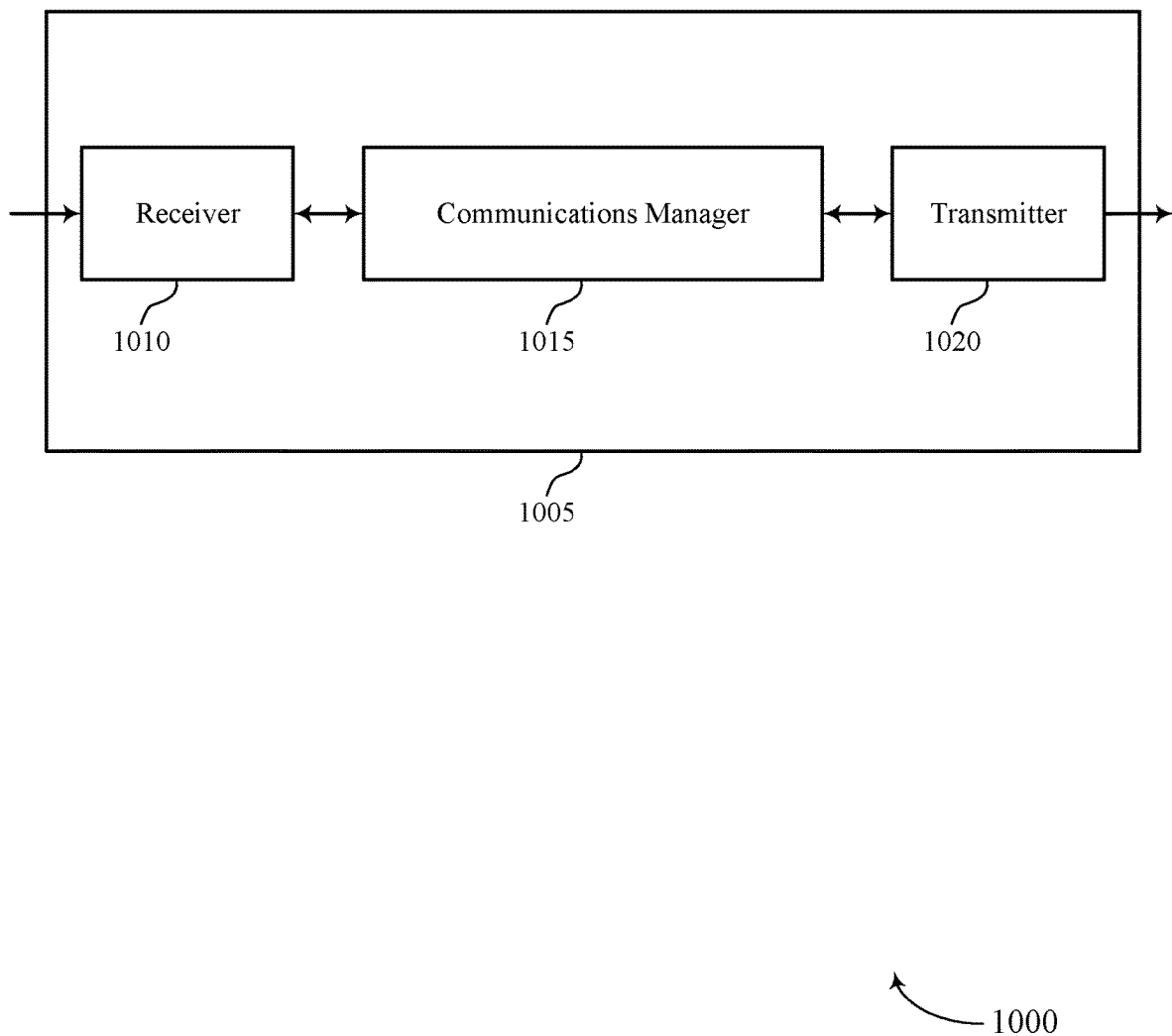
FIGS. 10 and 11 show block diagrams of devices that support time division duplexing techniques for dual connectivity to different radio access networks in accordance with aspects of the present disclosure.

FIG. 10 shows a block diagram 1000 of a device 1005 that supports time division duplexing techniques for dual connectivity to different radio access networks in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to TDD techniques for DC to different RANs, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish a first connection with a UE using a first RAN, and where a second connection is established at the UE using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, transmit downlink transmissions to the UE via the first RAN according to the reference TDD configuration, and receive uplink transmissions from the UE via the first RAN according to the designated TDD configuration, and where the UE transmits uplink transmissions via the second RAN according to the designated TDD configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
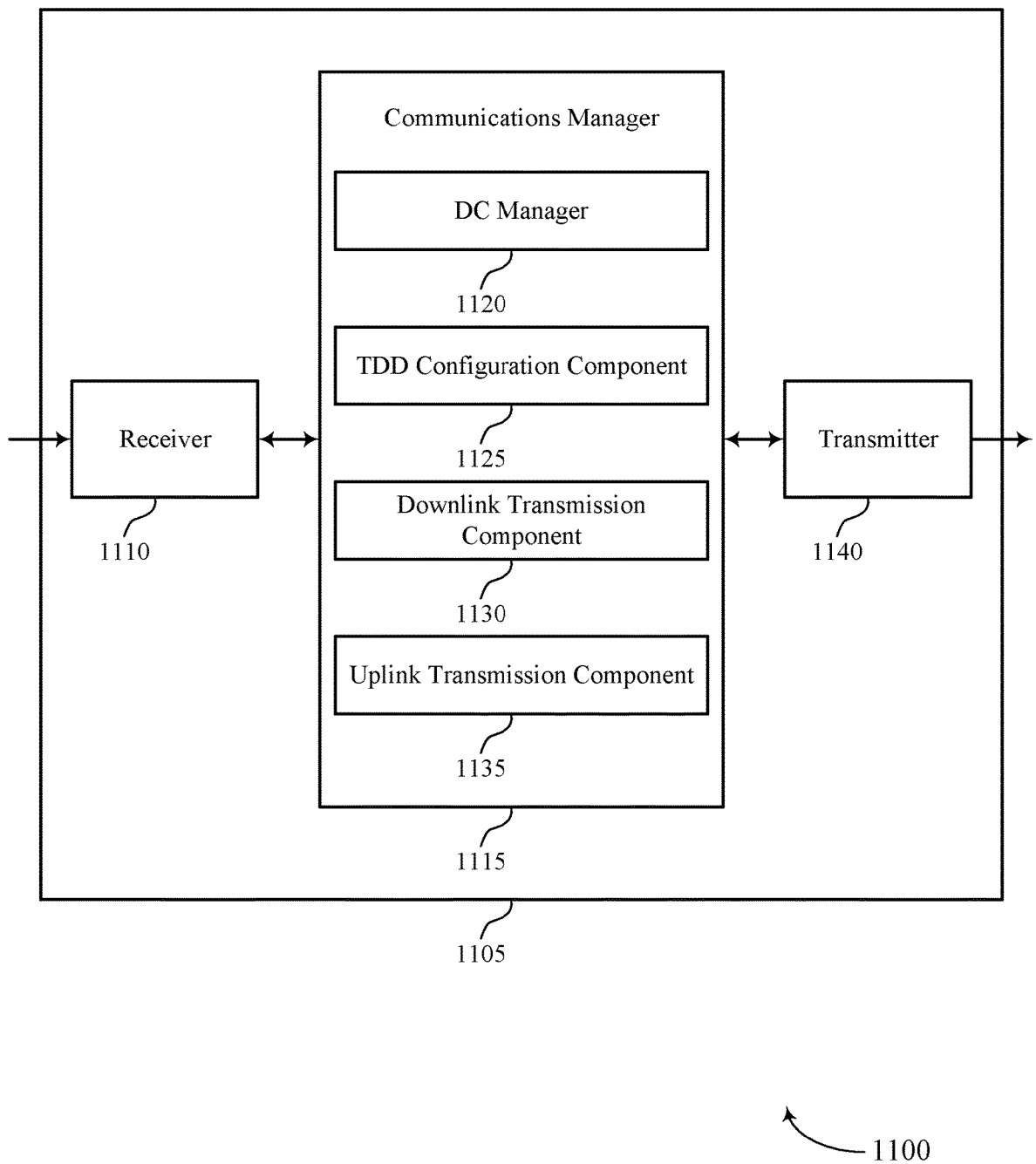

FIG. 11 shows a block diagram 1100 of a device 1105 that supports time division duplexing techniques for dual connectivity to different radio access networks in accordance with aspects of the present disclosure. The device 1105 may be an example of aspects of a device 1005 or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to TDD techniques for DC to different RANs, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DC manager 1120, a TDD configuration component 1125, a downlink transmission component 1130, and an uplink transmission component 1135. The communications manager 1115 may be an example of aspects of the communications manager 1310 described herein.

The DC manager 1120 may establish a first connection with a UE using a first RAN, and where a second connection is established at the UE using a second RAN.

The TDD configuration component 1125 may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes.

The downlink transmission component 1130 may transmit downlink transmissions to the UE via the first RAN according to the reference TDD configuration.

The uplink transmission component 1135 may receive uplink transmissions from the UE via the first RAN according to the designated TDD configuration, and where the UE transmits uplink transmissions via the second RAN according to the designated TDD configuration.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
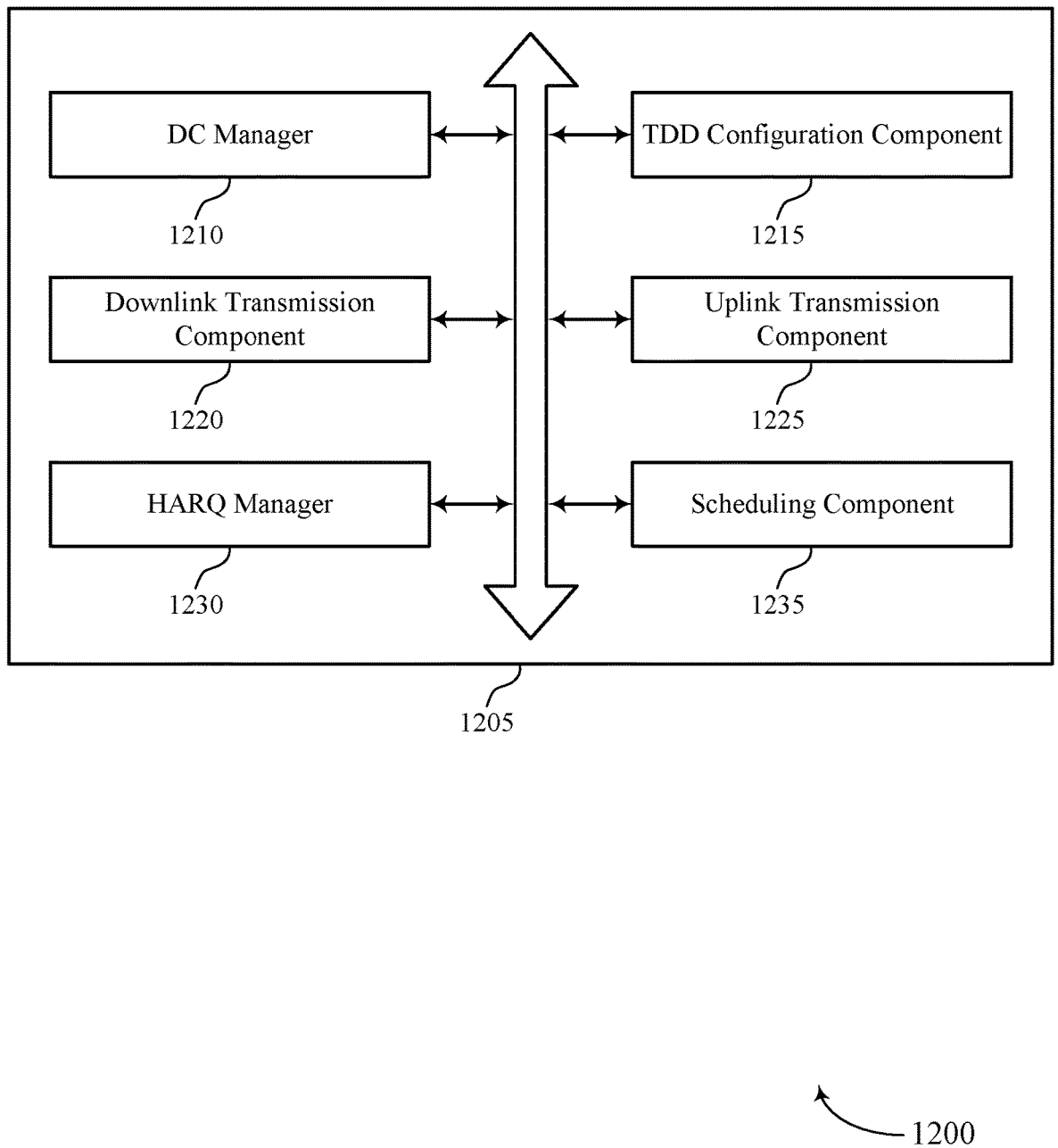
FIG. 12 shows a block diagram of a communications manager that supports time division duplexing techniques for dual connectivity to different radio access networks in accordance with aspects of the present disclosure.

FIG. 12 shows a block diagram 1200 of a communications manager 1205 that supports time division duplexing techniques for dual connectivity to different radio access networks in accordance with aspects of the present disclosure. The communications manager 1205 may be an example of aspects of a communications manager 1015, a communications manager 1115, or a communications manager 1310 described herein. The communications manager 1205 may include a DC manager 1210, a TDD configuration component 1215, a downlink transmission component 1220, an uplink transmission component 1225, a HARQ manager 1230, and a scheduling component 1235. Each of these modules may communicate, directly or indirectly, with one another (e.g., via one or more buses).

The DC manager 1210 may establish a first connection with a UE using a first RAN, and where a second connection is established at the UE using a second RAN. In some examples, the DC manager 1210 may receive, from the UE prior to identifying the reference TDD configuration, a dynamic sharing capability of the UE and single or dual transmission capability of the UE, and where the reference TDD configuration is identified based on the dynamic sharing capability and the single or dual transmission capability. In some cases, the first RAN is a fourth-generation (4G) or LTE RAN, and the second RAN is a fifth-generation (5G) or NR RAN. In some cases, the first connection using the first RAN is established as an MCG connection and the second connection using the second RAN is established as a SCG connection in a DC configuration.

The TDD configuration component 1215 may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes.

The downlink transmission component 1220 may transmit downlink transmissions to the UE via the first RAN according to the reference TDD configuration.

The uplink transmission component 1225 may receive uplink transmissions from the UE via the first RAN according to the designated TDD configuration, and where the UE transmits uplink transmissions via the second RAN according to the designated TDD configuration. In some examples, uplink shared channel transmissions of the first RAN are transmitted according to the designated TDD configuration. In some examples, uplink ACK/NACK feedback information, uplink shared channel data, uplink control channel data, uplink reference signals, and downlink ACK/NACK feedback of the second RAN are transmitted according to the designated TDD configuration.

The HARQ manager 1230 may manage ACK/NACK feedback corresponding to downlink HARQ processes of the first RAN according to the reference TDD configuration. In some examples, the HARQ manager 1230 may manage ACK/NACK feedback corresponding to uplink HARQ processes of the first RAN according to the designated TDD configuration.

The scheduling component 1235 may schedule the UE for uplink transmissions via the first RAN and the second RAN, where uplink transmissions of the first RAN are scheduled in different uplink subframes of the designated TDD configuration than uplink transmissions of the second RAN. In some examples, the scheduling component 1235 may receive uplink transmissions from the UE according to the scheduling. In some examples, the scheduling component 1235 may receive a first uplink transmission of the first RAN in a first TDD uplink subframe when the first uplink transmission of the first RAN and a second uplink transmission of the second RAN are both scheduled in the first TDD uplink subframe, and where the UE drops the second uplink transmission of the second RAN. In some cases, the UE is configured to identify an error case when a first uplink transmission of the first RAN and a second uplink transmission of the second RAN are both scheduled in a same first TDD uplink subframe.

Figure 13:
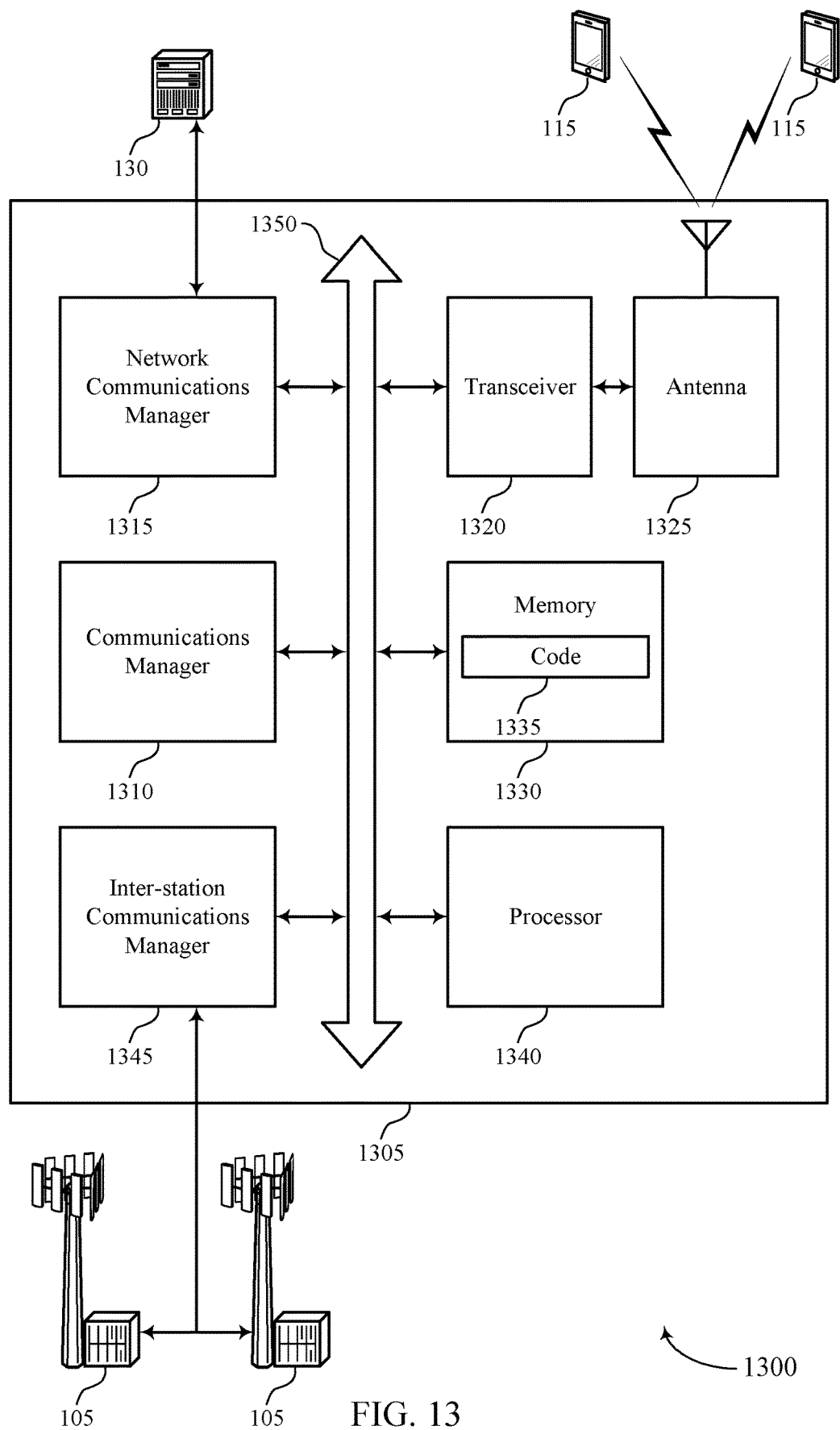
FIG. 13 shows a diagram of a system including a device that supports time division duplexing techniques for dual connectivity to different radio access networks in accordance with aspects of the present disclosure.

FIG. 13 shows a diagram of a system 1300 including a device 1305 that supports time division duplexing techniques for dual connectivity to different radio access networks in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may establish a first connection with a UE using a first RAN, and where a second connection is established at the UE using a second RAN, identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes, transmit downlink transmissions to the UE via the first RAN according to the reference TDD configuration, and receive uplink transmissions from the UE via the first RAN according to the designated TDD configuration, and where the UE transmits uplink transmissions via the second RAN according to the designated TDD configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting TDD techniques for DC to different RANs).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
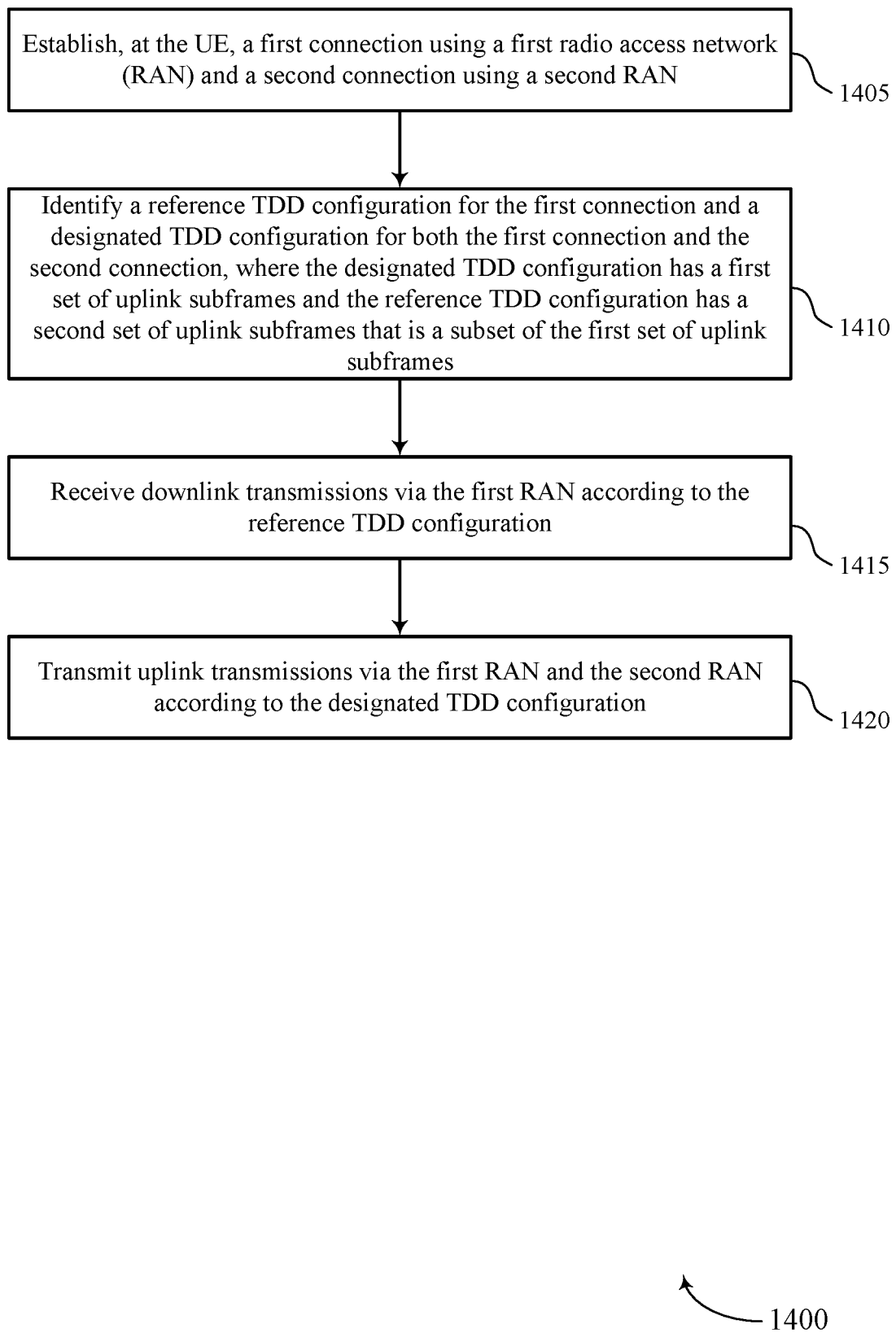
FIGS. 14 through 18 show flowcharts illustrating methods that support time division duplexing techniques for dual connectivity to different radio access networks in accordance with aspects of the present disclosure.

FIG. 14 shows a flowchart illustrating a method 1400 that supports time division duplexing techniques for dual connectivity to different radio access networks in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may establish a first connection using a first RAN and a second connection using a second RAN. The operations of 1405 may be performed according to the methods described herein. In some examples, aspects of the operations of 1405 may be performed by a DC manager as described with reference to FIGS. 6 through 9. In some cases, the UE may determine, prior to identifying the reference TDD configuration, a dynamic sharing capability of the UE and single or dual transmission capability of the UE, and where the reference TDD configuration is identified based on the dynamic sharing capability and the single or dual transmission capability.

At 1410, the UE may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes. The operations of 1410 may be performed according to the methods described herein. In some examples, aspects of the operations of 1410 may be performed by a TDD configuration component as described with reference to FIGS. 6 through 9.

At 1420, the UE may receive downlink transmissions via the first RAN according to the reference TDD configuration. The operations of 1420 may be performed according to the methods described herein. In some examples, aspects of the operations of 1420 may be performed by a downlink transmission component as described with reference to FIGS. 6 through 9.

At 1425, the UE may transmit uplink transmissions via the first RAN and the second RAN according to the designated TDD configuration. The operations of 1425 may be performed according to the methods described herein. In some examples, aspects of the operations of 1425 may be performed by an uplink transmission component as described with reference to FIGS. 6 through 9. In some cases, ACK/NACK feedback corresponding to downlink HARQ processes of the first RAN is transmitted according to the reference TDD configuration. In some cases, ACK/NACK feedback corresponding to uplink HARQ processes of the first RAN is transmitted according to the designated TDD configuration. In some cases, uplink shared channel transmissions of the first RAN are transmitted according to the designated TDD configuration. In some cases, uplink ACK/NACK feedback information, uplink shared channel data, uplink control channel data, uplink reference signals, and downlink ACK/NACK feedback of the second RAN are transmitted according to the designated TDD configuration.

Figure 15:
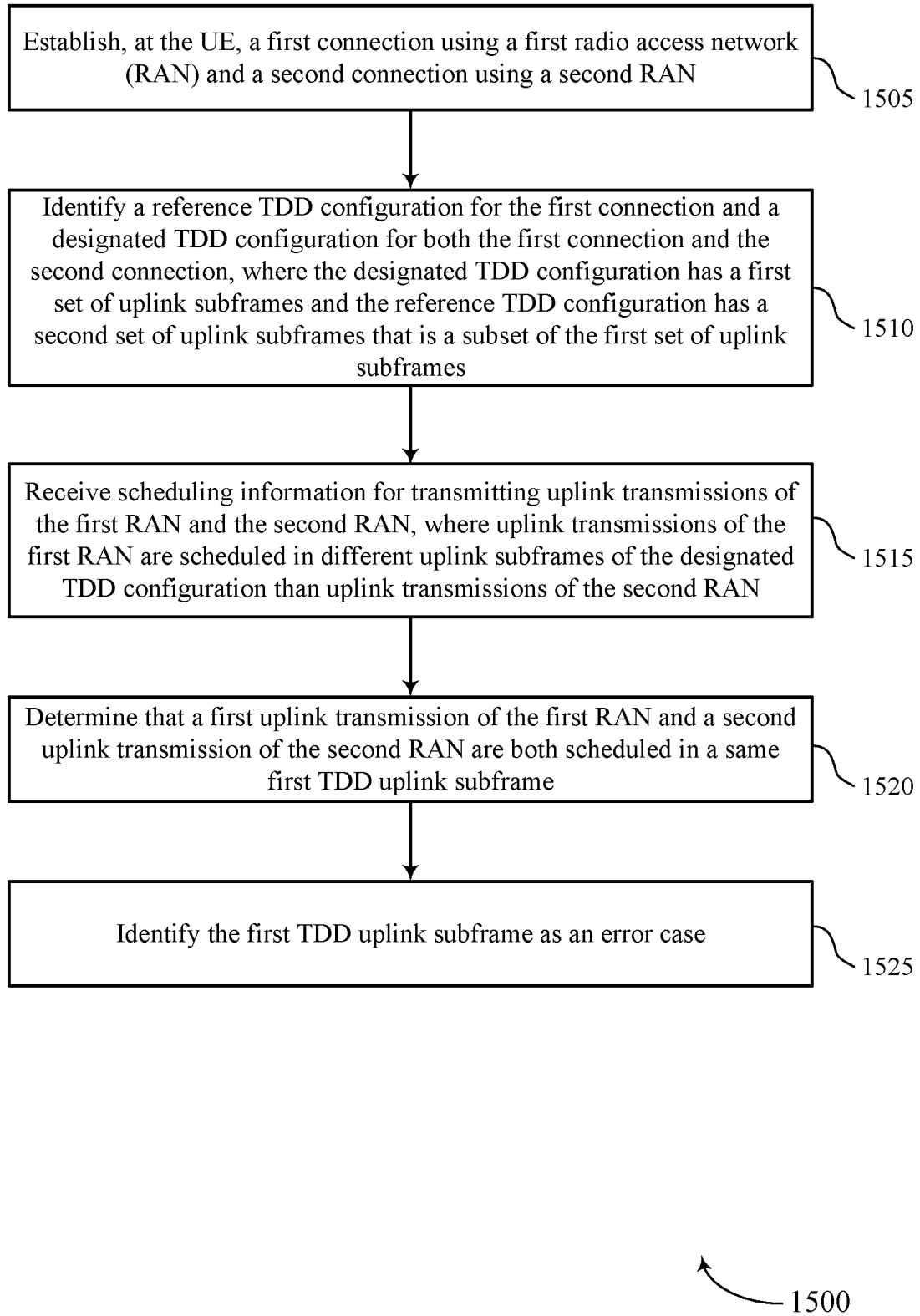

FIG. 15 shows a flowchart illustrating a method 1500 that supports time division duplexing techniques for dual connectivity to different radio access networks in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may establish a first connection using a first RAN and a second connection using a second RAN. The operations of 1505 may be performed according to the methods described herein. In some examples, aspects of the operations of 1505 may be performed by a DC manager as described with reference to FIGS. 6 through 9.

At 1510, the UE may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes. The operations of 1510 may be performed according to the methods described herein. In some examples, aspects of the operations of 1510 may be performed by a TDD configuration component as described with reference to FIGS. 6 through 9. In some cases, At 1515, the UE may receive scheduling information for transmitting uplink transmissions of the first RAN and the second RAN, where uplink transmissions of the first RAN are scheduled in different uplink subframes of the designated TDD configuration than uplink transmissions of the second RAN. The operations of 1515 may be performed according to the methods described herein. In some examples, aspects of the operations of 1515 may be performed by a scheduling component as described with reference to FIGS. 6 through 9.

At 1520, the UE may determine that a first uplink transmission of the first RAN and a second uplink transmission of the second RAN are both scheduled in a same first TDD uplink subframe. The operations of 1520 may be performed according to the methods described herein. In some examples, aspects of the operations of 1520 may be performed by a scheduling component as described with reference to FIGS. 6 through 9.

At 1525, the UE may identify the first TDD uplink subframe as an error case. The operations of 1525 may be performed according to the methods described herein. In some examples, aspects of the operations of 1525 may be performed by a scheduling component as described with reference to FIGS. 6 through 9. The UE may transmit uplink transmissions of the first RAN and the second RAN according to the scheduling information.

Figure 16:
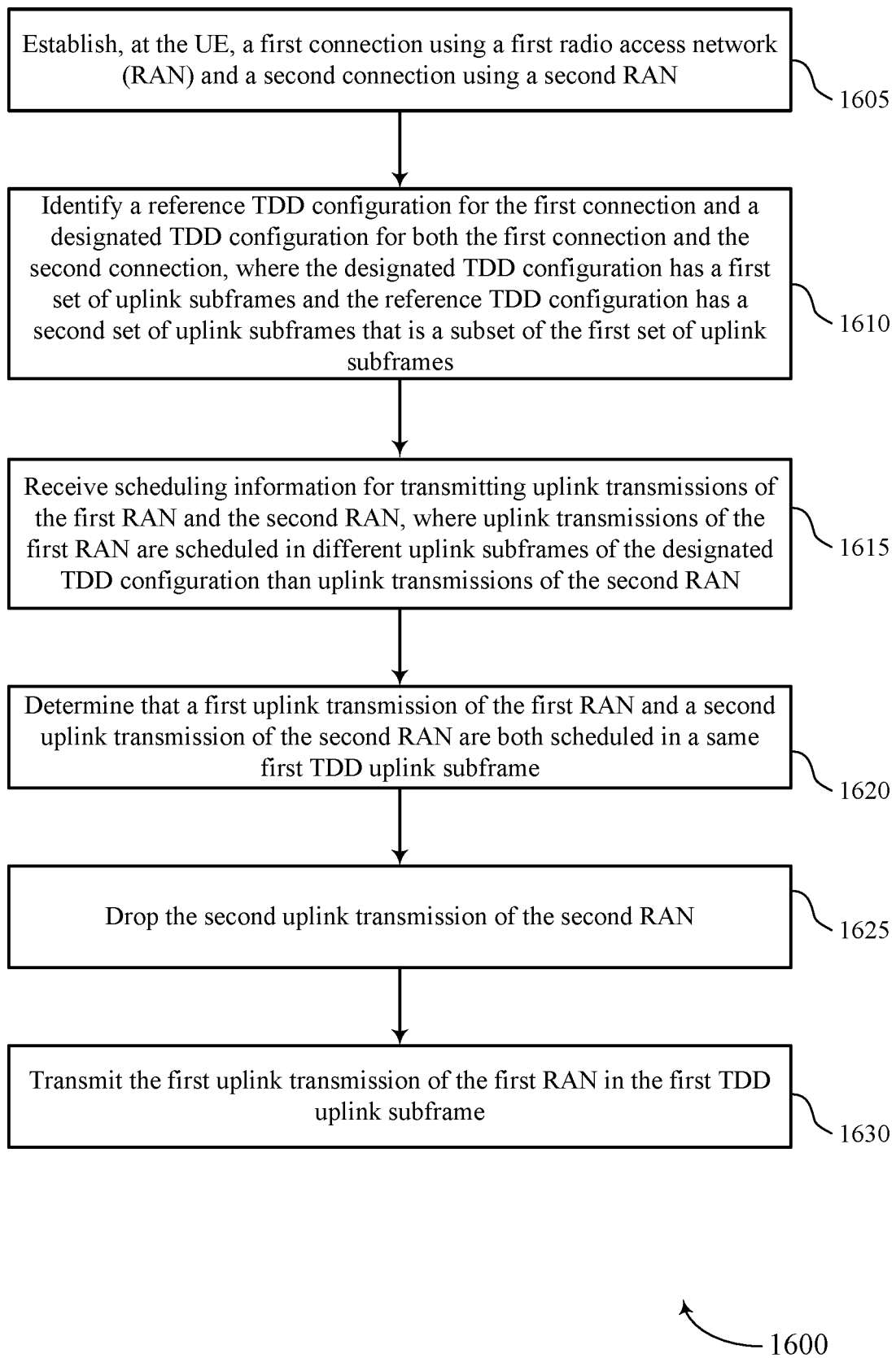

FIG. 16 shows a flowchart illustrating a method 1600 that supports time division duplexing techniques for dual connectivity to different radio access networks in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may establish a first connection using a first RAN and a second connection using a second RAN. The operations of 1605 may be performed according to the methods described herein. In some examples, aspects of the operations of 1605 may be performed by a DC manager as described with reference to FIGS. 6 through 9.

At 1610, the UE may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes. The operations of 1610 may be performed according to the methods described herein. In some examples, aspects of the operations of 1610 may be performed by a TDD configuration component as described with reference to FIGS. 6 through 9.

At 1615, the UE may receive scheduling information for transmitting uplink transmissions of the first RAN and the second RAN, where uplink transmissions of the first RAN are scheduled in different uplink subframes of the designated TDD configuration than uplink transmissions of the second RAN. The operations of 1615 may be performed according to the methods described herein. In some examples, aspects of the operations of 1615 may be performed by a scheduling component as described with reference to FIGS. 6 through 9.

At 1620, the UE may determine that a first uplink transmission of the first RAN and a second uplink transmission of the second RAN are both scheduled in a same first TDD uplink subframe. The operations of 1620 may be performed according to the methods described herein. In some examples, aspects of the operations of 1620 may be performed by a scheduling component as described with reference to FIGS. 6 through 9.

At 1625, the UE may drop the second uplink transmission of the second RAN. The operations of 1625 may be performed according to the methods described herein. In some examples, aspects of the operations of 1625 may be performed by a scheduling component as described with reference to FIGS. 6 through 9.

At 1630, the UE may transmit the first uplink transmission of the first RAN in the first TDD uplink subframe. The operations of 1630 may be performed according to the methods described herein. In some examples, aspects of the operations of 1630 may be performed by a scheduling component as described with reference to FIGS. 6 through 9.

Figure 17:
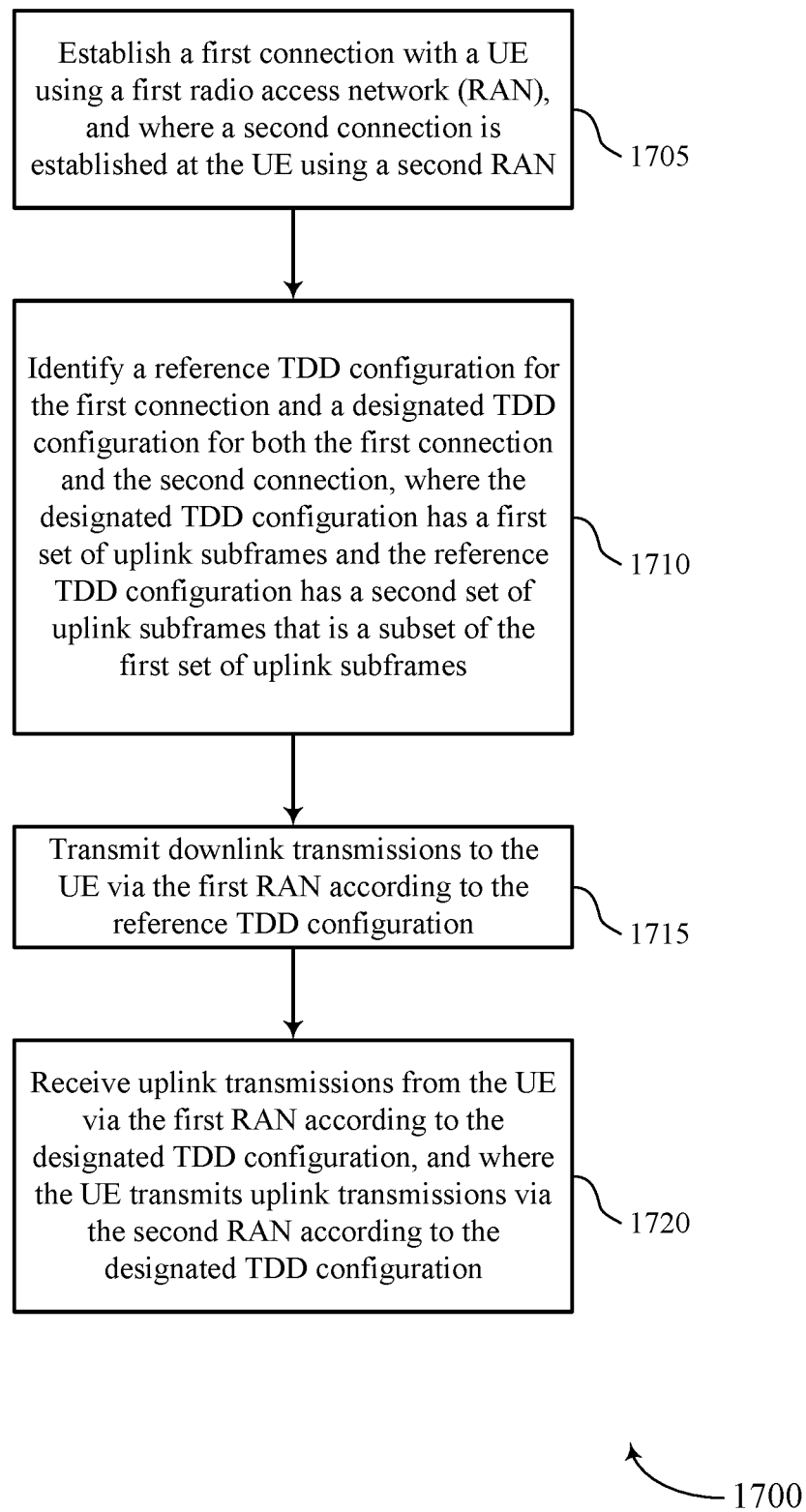

FIG. 17 shows a flowchart illustrating a method 1700 that supports time division duplexing techniques for dual connectivity to different radio access networks in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may establish a first connection with a UE using a first RAN, and where a second connection is established at the UE using a second RAN. The operations of 1705 may be performed according to the methods described herein. In some examples, aspects of the operations of 1705 may be performed by a DC manager as described with reference to FIGS. 10 through 13.

At 1710, the base station may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes. The operations of 1710 may be performed according to the methods described herein. In some examples, aspects of the operations of 1710 may be performed by a TDD configuration component as described with reference to FIGS. 10 through 13.

At 1715, the base station may transmit downlink transmissions to the UE via the first RAN according to the reference TDD configuration. The operations of 1715 may be performed according to the methods described herein. In some examples, aspects of the operations of 1715 may be performed by a downlink transmission component as described with reference to FIGS. 10 through 13.

At 1720, the base station may receive uplink transmissions from the UE via the first RAN according to the designated TDD configuration, and where the UE transmits uplink transmissions via the second RAN according to the designated TDD configuration. The operations of 1720 may be performed according to the methods described herein. In some examples, aspects of the operations of 1720 may be performed by an uplink transmission component as described with reference to FIGS. 10 through 13.

Figure 18:
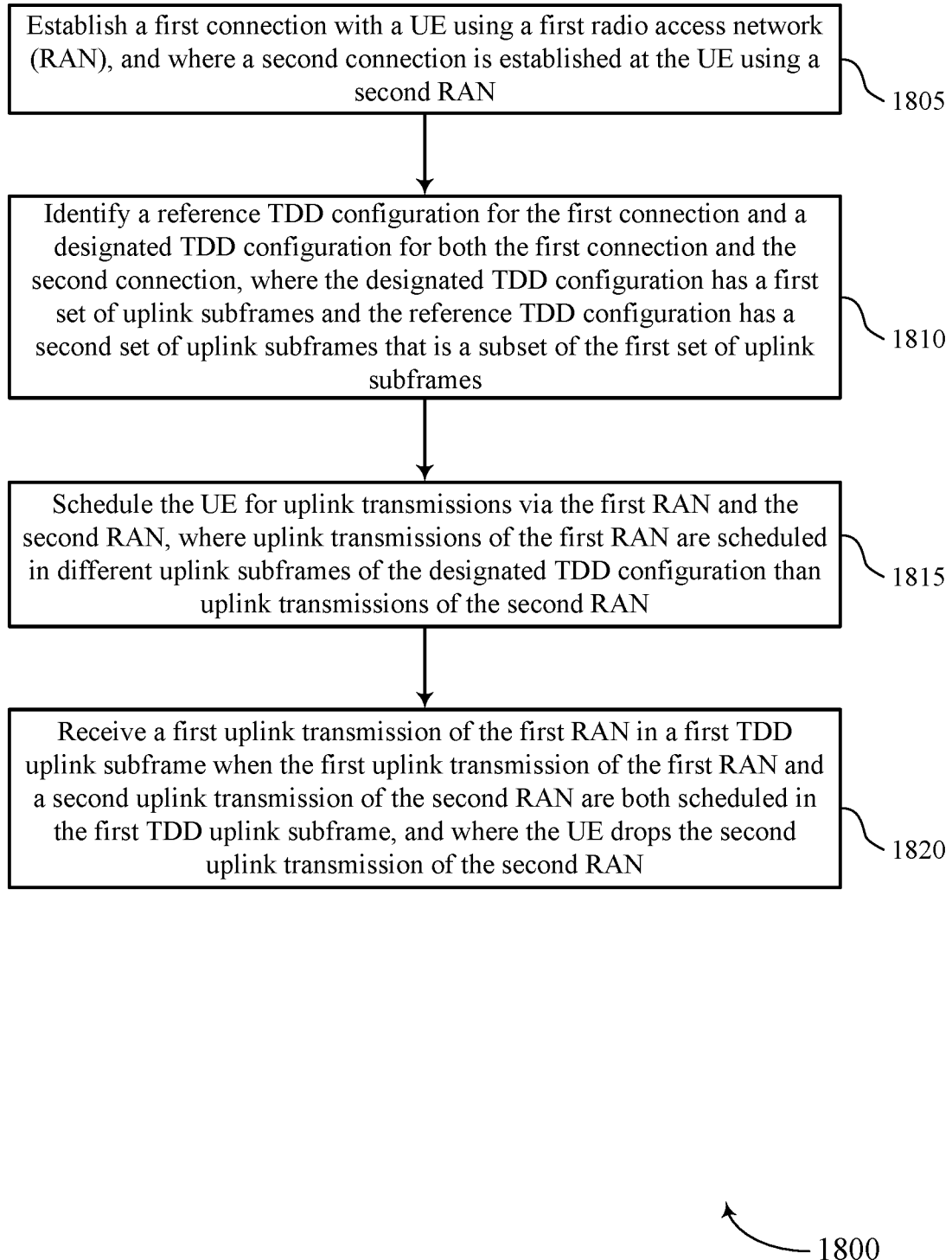

FIG. 18 shows a flowchart illustrating a method 1800 that supports time division duplexing techniques for dual connectivity to different radio access networks in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may establish a first connection with a UE using a first RAN, and where a second connection is established at the UE using a second RAN. The operations of 1805 may be performed according to the methods described herein. In some examples, aspects of the operations of 1805 may be performed by a DC manager as described with reference to FIGS. 10 through 13.

At 1810, the base station may identify a reference TDD configuration for the first connection and a designated TDD configuration for both the first connection and the second connection, where the designated TDD configuration has a first set of uplink subframes and the reference TDD configuration has a second set of uplink subframes that is a subset of the first set of uplink subframes. The operations of 1810 may be performed according to the methods described herein. In some examples, aspects of the operations of 1810 may be performed by a TDD configuration component as described with reference to FIGS. 10 through 13.

At 1815, the base station may schedule the UE for uplink transmissions via the first RAN and the second RAN, where uplink transmissions of the first RAN are scheduled in different uplink subframes of the designated TDD configuration than uplink transmissions of the second RAN. The operations of 1815 may be performed according to the methods described herein. In some examples, aspects of the operations of 1815 may be performed by a scheduling component as described with reference to FIGS. 10 through 13.

At 1820, the base station may receive a first uplink transmission of the first RAN in a first TDD uplink subframe when the first uplink transmission of the first RAN and a second uplink transmission of the second RAN are both scheduled in the first TDD uplink subframe, and where the UE drops the second uplink transmission of the second RAN. The operations of 1820 may be performed according to the methods described herein. In some examples, aspects of the operations of 1820 may be performed by a scheduling component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1x EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   establishing, at the UE, a first connection using a first radio access network (RAN) and a second connection using a second RAN;
   identifying a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
   receiving downlink transmissions via the first RAN according to the reference TDD configuration; and
   transmitting uplink transmissions via the first RAN and the second RAN according to the same designated TDD configuration, wherein the uplink subframes of the designated TDD configuration are usable for uplink transmissions via the first RAN and the second RAN.

2. The method of claim 1, wherein:
   acknowledgment/negative-acknowledgment (ACK/NACK) feedback corresponding to downlink hybrid acknowledgment repeat request (HARQ) processes of the first RAN is transmitted according to the reference TDD configuration.

3. The method of claim 2, wherein:
   ACK/NACK feedback corresponding to uplink HARQ processes of the first RAN is transmitted according to the designated TDD configuration.

4. The method of claim 3, wherein:
   uplink shared channel transmissions of the first RAN are transmitted according to the designated TDD configuration.

5. The method of claim 2, wherein:
   uplink ACK/NACK feedback information, uplink shared channel data, uplink control channel data, uplink reference signals, and downlink ACK/NACK feedback of the second RAN are transmitted according to the designated TDD configuration.

6. The method of claim 1, further comprising:
   receiving scheduling information for transmitting uplink transmissions of the first RAN and the second RAN, wherein uplink transmissions of the first RAN are scheduled in different uplink subframes of the designated TDD configuration than uplink transmissions of the second RAN; and
   transmitting uplink transmissions of the first RAN and the second RAN according to the scheduling information.

7. The method of claim 6, further comprising:
   determining that a first uplink transmission of the first RAN and a second uplink transmission of the second RAN are both scheduled in a same first TDD uplink subframe; and
   identifying the first TDD uplink subframe as an error case.

8. The method of claim 6, further comprising:
   determining that a first uplink transmission of the first RAN and a second uplink transmission of the second RAN are both scheduled in a same first TDD uplink subframe;
   dropping the second uplink transmission of the second RAN; and
   transmitting the first uplink transmission of the first RAN in the first TDD uplink subframe.

9. The method of claim 1, wherein the first RAN is a fourth-generation (4G) or long term evolution (LTE) RAN, and the second RAN is a fifth-generation (5G) or new radio (NR) RAN.

10. The method of claim 9, wherein the first connection using the first RAN is established as a master cell group (MCG) connection and the second connection using the second RAN is established as a secondary cell group (SCG) connection in a dual-connectivity (DC) configuration.

11. The method of claim 1, further comprising:
    determining, prior to identifying the reference TDD configuration, a dynamic sharing capability of the UE and single or dual transmission capability of the UE, and wherein the reference TDD configuration is identified based at least in part on the dynamic sharing capability and the single or dual transmission capability.

12. A method for wireless communication at a base station, comprising:
    establishing a first connection with a user equipment (UE) using a first radio access network (RAN), and wherein a second connection is established at the UE using a second RAN;
    identifying a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
    transmitting downlink transmissions to the UE via the first RAN according to the reference TDD configuration; and
    receiving uplink transmissions from the UE via the first RAN according to the designated TDD configuration, and wherein the UE transmits uplink transmissions via the second RAN according to the designated TDD configuration, and wherein the uplink subframes of the designated TDD configuration are usable for uplink transmissions via the first RAN and the second RAN.

13. The method of claim 12, wherein:
    acknowledgment/negative-acknowledgment (ACK/NACK) feedback corresponding to downlink hybrid acknowledgment repeat request (HARD) processes of the first RAN is transmitted according to the reference TDD configuration.

14. The method of claim 13, wherein:
    ACK/NACK feedback corresponding to uplink HARQ processes of the first RAN is transmitted according to the designated TDD configuration.

15. The method of claim 14, wherein:
uplink shared channel transmissions of the first RAN are transmitted according to the designated TDD configuration.

16. The method of claim 13, wherein:
uplink ACK/NACK feedback information, uplink shared channel data, uplink control channel data, uplink reference signals, and downlink ACK/NACK feedback of the second RAN are transmitted according to the designated TDD configuration.

17. The method of claim 12, further comprising:
scheduling the UE for uplink transmissions via the first RAN and the second RAN, wherein uplink transmissions of the first RAN are scheduled in different uplink subframes of the designated TDD configuration than uplink transmissions of the second RAN; and
receiving uplink transmissions from the UE according to the scheduling.

18. The method of claim 17, wherein the UE is configured to identify an error case when a first uplink transmission of the first RAN and a second uplink transmission of the second RAN are both scheduled in a same first TDD uplink subframe.

19. The method of claim 17, further comprising:
receiving a first uplink transmission of the first RAN in a first TDD uplink subframe when the first uplink transmission of the first RAN and a second uplink transmission of the second RAN are both scheduled in the first TDD uplink subframe, and wherein the UE drops the second uplink transmission of the second RAN.

20. The method of claim 12, wherein the first RAN is a fourth-generation (4G) or long term evolution (LTE) RAN, and the second RAN is a fifth-generation (5G) or new radio (NR) RAN.

21. The method of claim 20, wherein the first connection using the first RAN is established as a master cell group (MCG) connection and the second connection using the second RAN is established as a secondary cell group (SCG) connection in a dual-connectivity (DC) configuration.

22. The method of claim 12, further comprising:
receiving, from the UE prior to identifying the reference TDD configuration, a dynamic sharing capability of the UE and single or dual transmission capability of the UE, and wherein the reference TDD configuration is identified based at least in part on the dynamic sharing capability and the single or dual transmission capability.

23. An apparatus for wireless communication at a user equipment (UE), comprising:
a processor,
memory in electronic communication with the processor; and
instructions stored in the memory and executable by the processor to cause the apparatus to:
establish, at the UE, a first connection using a first radio access network (RAN) and a second connection using a second RAN;
identify a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
receive downlink transmissions via the first RAN according to the reference TDD configuration; and
transmit uplink transmissions via the first RAN and the second RAN according to the same designated TDD configuration, wherein the uplink subframes of the designated TDD configuration are usable for uplink transmissions via the first RAN and the second RAN.

24. The apparatus of claim 23, wherein acknowledgment/negative-acknowledgment (ACK/NACK) feedback corresponding to downlink hybrid acknowledgment repeat request (HARQ) processes of the first RAN is transmitted according to the reference TDD configuration.

25. The apparatus of claim 24, wherein ACK/NACK feedback corresponding to uplink HARQ processes of the first RAN is transmitted according to the designated TDD configuration.

26. The apparatus of claim 25, wherein uplink shared channel transmissions of the first RAN are transmitted according to the designated TDD configuration.

27. The apparatus of claim 24, wherein uplink ACK/NACK feedback information, uplink shared channel data, uplink control channel data, uplink reference signals, and downlink ACK/NACK feedback of the second RAN are transmitted according to the designated TDD configuration.

28. The apparatus of claim 23, wherein the instructions are further executable by the processor to cause the apparatus to:
receive scheduling information for transmitting uplink transmissions of the first RAN and the second RAN, wherein uplink transmissions of the first RAN are scheduled in different uplink subframes of the designated TDD configuration than uplink transmissions of the second RAN; and
transmit uplink transmissions of the first RAN and the second RAN according to the scheduling information.

29. The apparatus of claim 28, wherein the instructions are further executable by the processor to cause the apparatus to:
determine that a first uplink transmission of the first RAN and a second uplink transmission of the second RAN are both scheduled in a same first TDD uplink subframe; and
identify the first TDD uplink subframe as an error case.

30. The apparatus of claim 28, wherein the instructions are further executable by the processor to cause the apparatus to:
determine that a first uplink transmission of the first RAN and a second uplink transmission of the second RAN are both scheduled in a same first TDD uplink subframe;
drop the second uplink transmission of the second RAN; and
transmit the first uplink transmission of the first RAN in the first TDD uplink subframe.

31. The apparatus of claim 23, wherein the first RAN is a fourth-generation (4G) or long term evolution (LTE) RAN, and the second RAN is a fifth-generation (5G) or new radio (NR) RAN.

32. The apparatus of claim 31, wherein the first connection using the first RAN is established as a master cell group (MCG) connection and the second connection using the second RAN is established as a secondary cell group (SCG) connection in a dual-connectivity (DC) configuration.

33. The apparatus of claim 23, wherein the instructions are further executable by the processor to cause the apparatus to:
determine, prior to identifying the reference TDD configuration, a dynamic sharing capability of the UE and single or dual transmission capability of the UE, and wherein the reference TDD configuration is identified based at least in part on the dynamic sharing capability and the single or dual transmission capability.

34. An apparatus for wireless communication at a base station, comprising:
a processor,
memory in electronic communication with the processor; and
instructions stored in the memory and executable by the processor to cause the apparatus to:
establish a first connection with a user equipment (UE) using a first radio access network (RAN), and wherein a second connection is established at the UE using a second RAN;
identify a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
transmit downlink transmissions to the UE via the first RAN according to the reference TDD configuration; and
receive uplink transmissions from the UE via the first RAN according to the designated TDD configuration, and wherein the UE transmits uplink transmissions via the second RAN according to the designated TDD configuration, and wherein the uplink subframes of the designated TDD configuration are usable for uplink transmissions via the first RAN and the second RAN.

35. The apparatus of claim 34, wherein acknowledgment/negative-acknowledgment (ACK/NACK) feedback corresponding to downlink hybrid acknowledgment repeat request (HARQ) processes of the first RAN is transmitted according to the reference TDD configuration.

36. The apparatus of claim 35, wherein ACK/NACK feedback corresponding to uplink HARQ processes of the first RAN is transmitted according to the designated TDD configuration.

37. The apparatus of claim 36, wherein uplink shared channel transmissions of the first RAN are transmitted according to the designated TDD configuration.

38. The apparatus of claim 35, wherein uplink ACK/NACK feedback information, uplink shared channel data, uplink control channel data, uplink reference signals, and downlink ACK/NACK feedback of the second RAN are transmitted according to the designated TDD configuration.

39. The apparatus of claim 34, wherein the instructions are further executable by the processor to cause the apparatus to:
schedule the UE for uplink transmissions via the first RAN and the second RAN, wherein uplink transmissions of the first RAN are scheduled in different uplink subframes of the designated TDD configuration than uplink transmissions of the second RAN; and
receive uplink transmissions from the UE according to the scheduling.

40. The apparatus of claim 39, wherein the UE is configured to identify an error case when a first uplink transmission of the first RAN and a second uplink transmission of the second RAN are both scheduled in a same first TDD uplink subframe.

41. The apparatus of claim 39, wherein the instructions are further executable by the processor to cause the apparatus to:
receive a first uplink transmission of the first RAN in a first TDD uplink subframe when the first uplink transmission of the first RAN and a second uplink transmission of the second RAN are both scheduled in the first TDD uplink subframe, and wherein the UE drops the second uplink transmission of the second RAN.

42. The apparatus of claim 34, wherein the first RAN is a fourth-generation (4G) or long term evolution (LTE) RAN, and the second RAN is a fifth-generation (5G) or new radio (NR) RAN.

43. The apparatus of claim 42, wherein the first connection using the first RAN is established as a master cell group (MCG) connection and the second connection using the second RAN is established as a secondary cell group (SCG) connection in a dual-connectivity (DC) configuration.

44. The apparatus of claim 34, wherein the instructions are further executable by the processor to cause the apparatus to:
receive, from the UE prior to identifying the reference TDD configuration, a dynamic sharing capability of the UE and single or dual transmission capability of the UE, and wherein the reference TDD configuration is identified based at least in part on the dynamic sharing capability and the single or dual transmission capability.

45. An apparatus for wireless communication at a user equipment (UE), comprising:
means for establishing, at the UE, a first connection using a first radio access network (RAN) and a second connection using a second RAN;
means for identifying a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
means for receiving downlink transmissions via the first RAN according to the reference TDD configuration; and
means for transmitting uplink transmissions via the first RAN and the second RAN according to the same designated TDD configuration, wherein the uplink subframes of the designated TDD configuration are usable for uplink transmissions via the first RAN and the second RAN.

46. An apparatus for wireless communication at a base station, comprising:
means for establishing a first connection with a user equipment (UE) using a first radio access network (RAN), and wherein a second connection is established at the UE using a second RAN;
means for identifying a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
means for transmitting downlink transmissions to the UE via the first RAN according to the reference TDD configuration; and means for receiving uplink transmissions from the UE via the first RAN according to the designated TDD configuration, and wherein the UE transmits uplink transmissions via the second RAN according to the designated TDD configuration, and wherein the uplink subframes of the designated TDD configuration are usable for uplink transmissions via the first RAN and the second RAN.

47. A non-transitory computer-readable medium storing code for wireless communication at a user equipment (UE), the code comprising instructions executable by a processor to:
establish, at the UE, a first connection using a first radio access network (RAN) and a second connection using a second RAN;
identify a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
receive downlink transmissions via the first RAN according to the reference TDD configuration; and
transmit uplink transmissions via the first RAN and the second RAN according to the same designated TDD configuration, wherein the uplink subframes of the designated TDD configuration are usable for uplink transmissions via the first RAN and the second RAN.

48. A non-transitory computer-readable medium storing code for wireless communication at a base station, the code comprising instructions executable by a processor to:
establish a first connection with a user equipment (UE) using a first radio access network (RAN), and wherein a second connection is established at the UE using a second RAN;
identify a reference time division duplexing (TDD) configuration for the first connection and a designated TDD configuration for both the first connection and the second connection, wherein the designated TDD configuration has a first set of uplink subframes and the reference TDD configuration has a second set of uplink subframes that is a subset of the first set of uplink subframes;
transmit downlink transmissions to the UE via the first RAN according to the reference TDD configuration; and
receive uplink transmissions from the UE via the first RAN according to the designated TDD configuration, and wherein the UE transmits uplink transmissions via the second RAN according to the designated TDD configuration, and wherein the uplink subframes of the designated TDD configuration are usable for uplink transmissions via the first RAN and the second RAN.

* * * * *